(12) United States Patent
Fujinaga

(10) Patent No.: US 9,722,669 B2
(45) Date of Patent: Aug. 1, 2017

(54) INFORMATION PROCESSING APPARATUS, CONTROL METHOD THEREFOR, AND COMPUTER-READABLE STORAGE MEDIUM

(71) Applicant: CANON KABUSHIKI KAISHA, Tokyo (JP)

(72) Inventor: Seiya Fujinaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 14/627,131

(22) Filed: Feb. 20, 2015

(65) Prior Publication Data
US 2015/0244423 A1 Aug. 27, 2015

(30) Foreign Application Priority Data

Feb. 27, 2014 (JP) .................................. 2014-037318

(51) Int. Cl.
H04B 5/00 (2006.01)
(52) U.S. Cl.
CPC ......... *H04B 5/0031* (2013.01); *H04B 5/0056* (2013.01)
(58) Field of Classification Search
None
See application file for complete search history.

(56) References Cited

U.S. PATENT DOCUMENTS

| 8,880,028 B2* | 11/2014 | Han | H04M 1/7253 235/492 |
|---|---|---|---|
| 2012/0315844 A1* | 12/2012 | Cox | H04B 5/0031 455/41.1 |
| 2013/0203346 A1* | 8/2013 | Han | H04M 1/7253 455/41.1 |
| 2014/0253466 A1* | 9/2014 | Brewer | G06F 3/03545 345/173 |
| 2014/0256250 A1* | 9/2014 | Cueto | H04B 5/0031 455/41.1 |

FOREIGN PATENT DOCUMENTS

| JP | 2006-340325 A | 12/2006 |
| JP | 2008-033917 A | 2/2008 |

* cited by examiner

*Primary Examiner* — Tuan A Tran
(74) *Attorney, Agent, or Firm* — Fitzpatrick, Cella, Harper & Scinto

(57) ABSTRACT

Communication with an operation device is performed by power generated when a communication portion included in the operation device comes close to within a predetermined distance range of an information processing apparatus. While communication with the communication portion is established, the operation of the information processing apparatus is controlled in accordance with information acquired via the communication portion of the operation device.

13 Claims, 21 Drawing Sheets

WHEN INITIATOR TRANSMITS DATA

WHEN TARGET TRANSMITS DATA

WHEN INITIATOR TRANSMITS DATA

WHEN TARGET TRANSMITS DATA

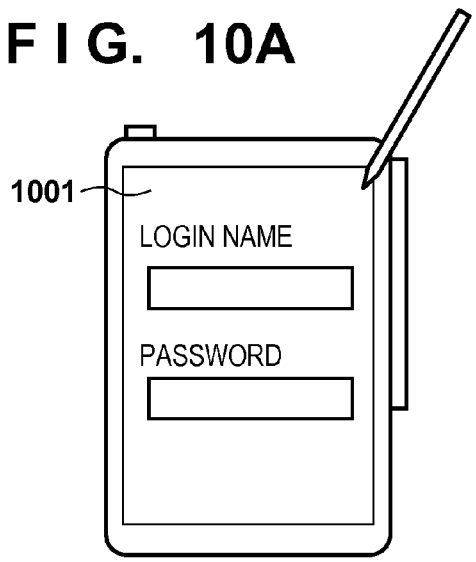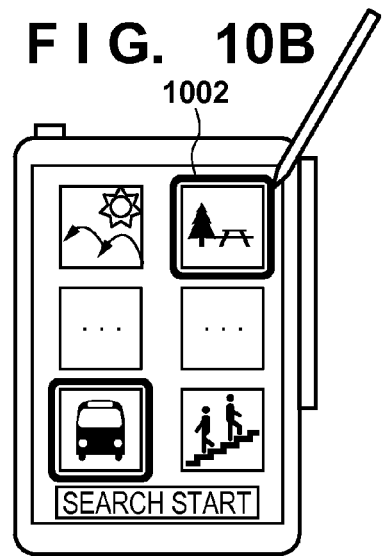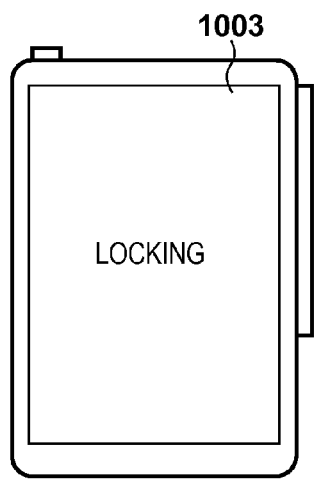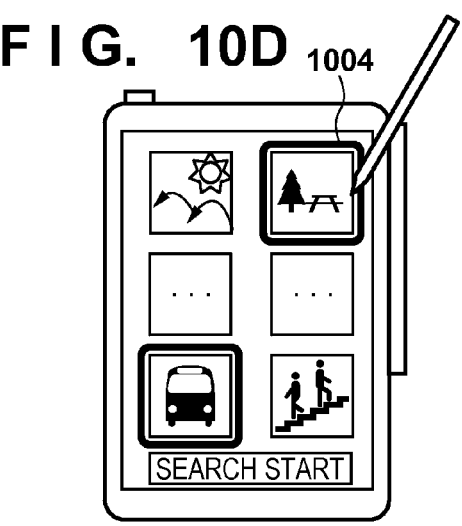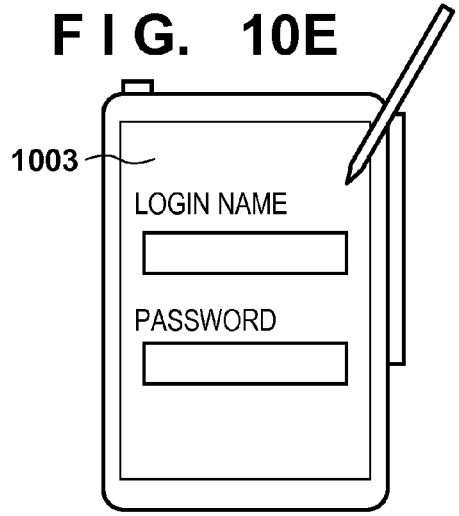

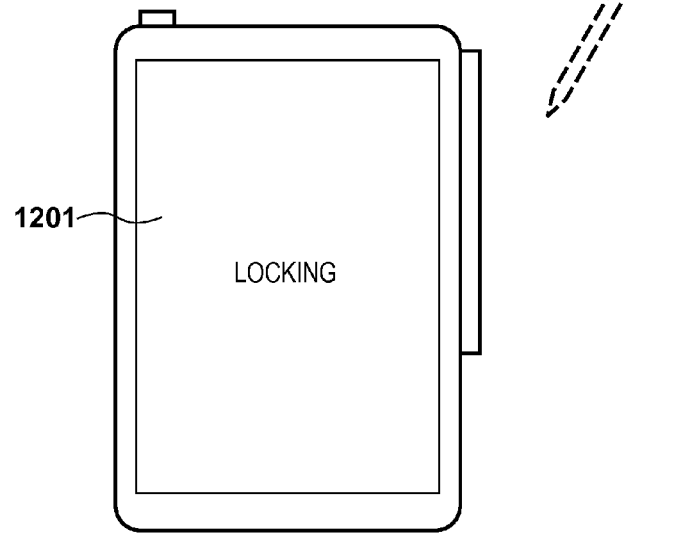
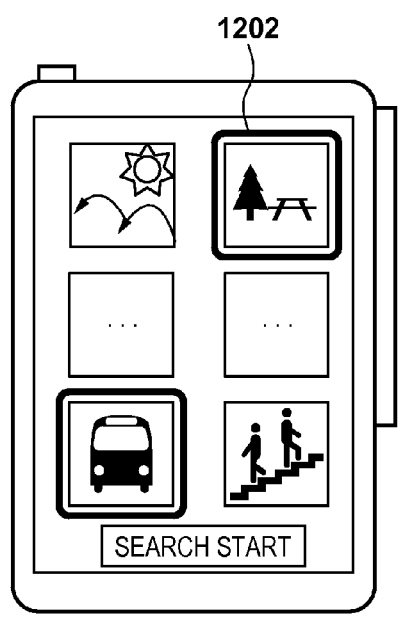
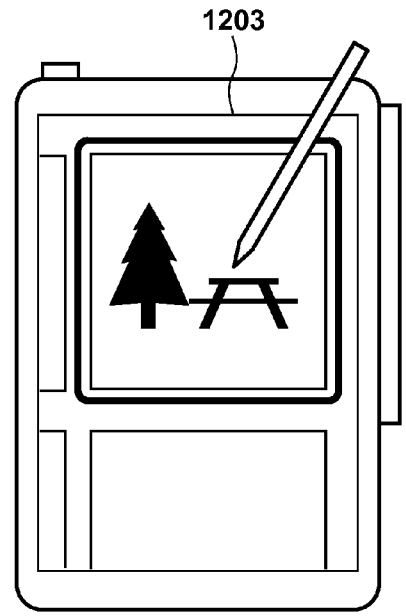

US 9,722,669 B2

INFORMATION PROCESSING APPARATUS, CONTROL METHOD THEREFOR, AND COMPUTER-READABLE STORAGE MEDIUM

BACKGROUND OF THE INVENTION

Field of the Invention

The present invention relates to a communication technique of communicating with an external device.

Description of the Related Art

Short distance wireless communication has been developed as a communication method, and there is known a technique of achieving security or performing authentication by using short distance wireless communication. There is proposed a method of issuing entry data to an IC card which enters a security management region, and issuing an entry data deletion instruction to an IC card which exits from the region (Japanese Patent Laid-Open No. 2008-033917).

There is also proposed a method of performing authentication using a tag ID and an apparatus, and displaying, if the tag ID is stored in the apparatus, data in accordance with the tag ID (Japanese Patent Laid-Open No. 2006-340325).

In the method proposed in Japanese Patent Laid-Open No. 2008-033917, however, when communication is performed, data information managed in the IC card is only rewritten, and the IC card is not used to operate an apparatus.

Likewise, in the method proposed in Japanese Patent Laid-Open No. 2006-340325, a card type IC having a tag ID is not used to operate an apparatus.

SUMMARY OF THE INVENTION

The present invention provides a technique of improving the operability of an information processing apparatus using an operation device.

To achieve this, an information processing apparatus according to the present invention has the following arrangement. That is, an information processing apparatus comprising: a communication unit configured to communicate with an operation device by power generated when a communication portion included in the operation device comes close to within a predetermined distance range; an acquisition unit configured to acquire information held by the operation device via the communication portion of the operation device; a reception unit configured to receive an operation from the operation device by an operation portion while the communication unit establishes communication with the communication portion; and a control unit configured to control an operation based on the information acquired by the acquisition unit while the communication unit establishes communication with the communication portion.

According to the present invention, it is possible to improve the operability of an information processing apparatus using an operation device.

Further features of the present invention will become apparent from the following description of exemplary embodiments (with reference to the attached drawings).

BRIEF DESCRIPTION OF THE DRAWINGS

FIGS. 10A to 10E are views showing a case in which when operating the portable communication terminal apparatus using the stylus, the behavior changes depending on an elapsed time;

FIGS. 12A to 12C are views showing a case in which a display image is enlarged using the stylus in the portable communication terminal apparatus;

DESCRIPTION OF THE EMBODIMENTS

An embodiment of the present invention will be exemplarily described in detail below with reference to the accompanying drawings. Note that the relative arrangement of components, display screens, and the like set forth in the embodiment do not intend to limit the scope of the invention to them, unless otherwise specified.

In this embodiment, an apparatus and a device for operating the apparatus receive an operation to the operation portion of the apparatus using short distance wireless communication. In this embodiment, a low-speed communication portion using short distance wireless communication receives an operation to the operation portion of the apparatus, and is then switched to a high-speed communication portion using wireless communication to perform other processes. Other processes include, for example, transmission of image data. More specifically, image data is transmitted using a handover technique in which, for example, authentication is performed by short distance wireless communication such as NFC (Near Field Communication) and wireless communication of another communication method takes over the communication.

Note that short distance wireless communication indicates wireless communication whose communication range is a relatively narrow predetermined range (for example, 1 m to several cm), which is represented by NFC.

<Basic Operation>

Figure 1:
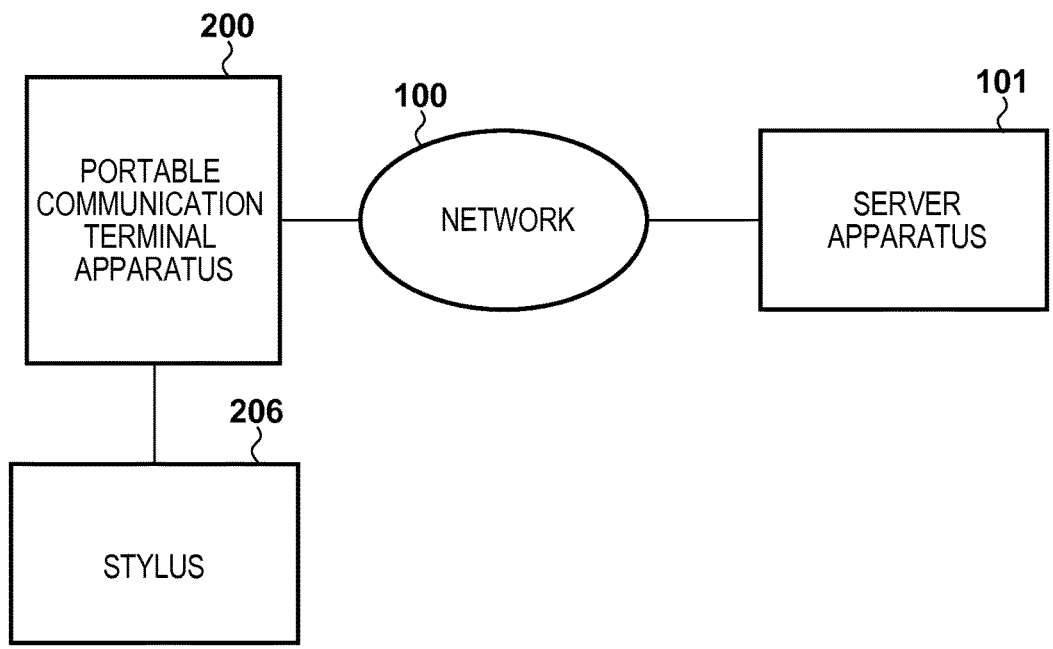
FIG. 1 is a block diagram showing an example of the configuration of a wireless communication system.

FIG. 1 is a block diagram showing the configuration of a wireless communication system.

The wireless communication system shown in FIG. 1 includes a server apparatus 101, a portable communication terminal apparatus 200, and a stylus 206 serving as a device for operating the apparatus. The server apparatus 101 and the portable communication terminal apparatus 200 which is one of information processing apparatuses are connected via a network 100. The portable communication terminal apparatus 200 is attached with the stylus 206.

The server apparatus 101 stores image data for printing. The server apparatus 101 provides various functions such as a user ID management function, and stores programs such as an image processing application.

The portable communication terminal apparatus 200 is an apparatus having at least two or more kinds of wireless communication functions with different authentication methods and different communication speeds. The portable communication terminal apparatus 200 is not particularly limited as long as it is possible to perform short distance wireless communication with a device to be authenticated. In this embodiment, the portable communication terminal apparatus 200 may be any apparatus which can process a file to be printed, for example, a personal information terminal such as a PDA (Personal Digital Assistant), a mobile phone, or a digital camera. The stylus 206 is a device to be authenticated, and is a pen type apparatus capable of operating the portable communication terminal apparatus 200. The stylus 206 and the portable communication terminal apparatus 200 can communicate with each other via wireless communication portions.

The network 100 and the server apparatus 101 are connected by, for example, a wired LAN. The network 100 and the portable communication terminal apparatus 200 are connected by a Wireless LAN (to be referred to as WLAN hereinafter). The stylus 206 and the portable communication terminal apparatus 200 can perform NFC communication via NFC units (to be described later).

Figure 2:
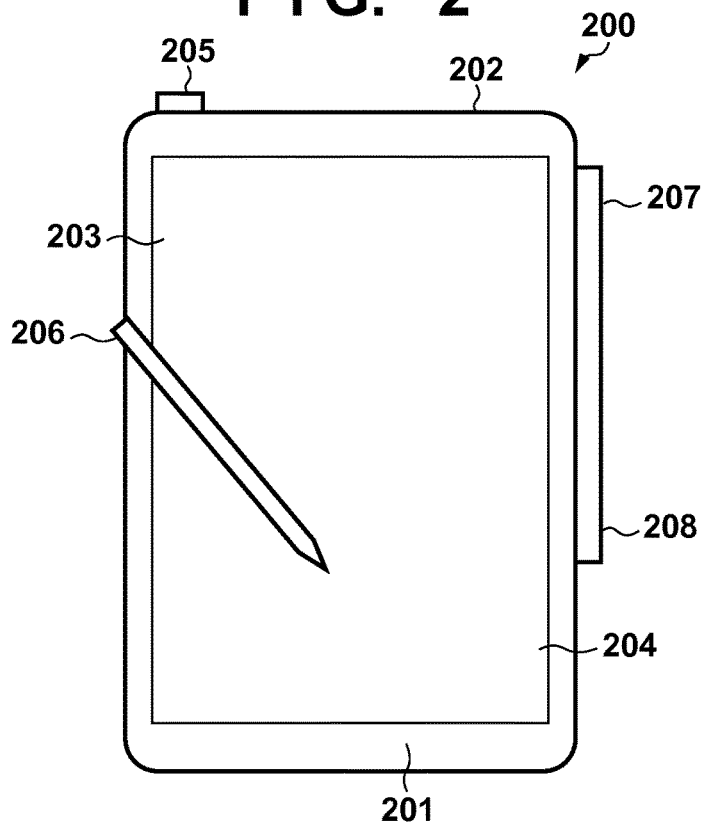
FIG. 2 is a view showing the outer appearance of a portable communication terminal apparatus.

FIG. 2 is a view showing the outer appearance of the portable communication terminal apparatus 200.

In this embodiment, a smartphone will be exemplified as the portable communication terminal apparatus 200. The smartphone indicates a multi-function mobile phone including a camera, network browser, and mail function in addition to a mobile phone function. The portable communication terminal apparatus 200 includes an NFC unit 201, a WLAN unit 202, a display portion 203, an operation portion 204, and a power supply key 205. The portable communication terminal apparatus 200 also includes a stylus housing portion 207 and a stylus housing discrimination switch 208 on a side surface.

The NFC unit 201 is a unit for performing communication using NFC. Communication can be performed by moving the NFC unit 201 close to within a predetermined distance (for example, about 10 cm) of another NFC unit.

A WLAN unit 202 is a unit for performing communication using WLAN, and is arranged within the portable communication terminal apparatus 200. The display portion 203 is a display having an LCD display mechanism. An operation portion 204 has a touch-panel operation mechanism, and detects user pressing information. The operation portion 204 functions as a reception portion for receiving an operation from the stylus 206. Note that in this embodiment, the display portion 203 and the operation portion 204 are arranged to overlap each other. The display portion 203 displays button icons and a software keyboard. When the user presses a button or the like on the operation portion 204 by a finger or the stylus 206 as an operation device, a button pressing event or the like is issued. The power supply key 205 is used to turn on/off the power.

The stylus 206 is a device for operating the portable communication terminal apparatus 200 and, more specifically, a device for operating the operation portion 204. In this embodiment, the stylus 206 incorporates an NFC unit communicable with the NFC unit 201. Therefore, power generated when the NFC unit of the stylus 206 comes close to within a predetermined distance range of the portable communication terminal apparatus 200 allows NFC communication between the NFC unit 201 and the NFC unit of the stylus 206.

The stylus housing portion 207 houses the stylus 206. The operation portion 204 is formed by a touch panel, and can thus be operated by an operation device such as the stylus 206 or a finger. The stylus housing discrimination switch 208 is a switch for discriminating whether the stylus 206 has been housed.

Figure 3:
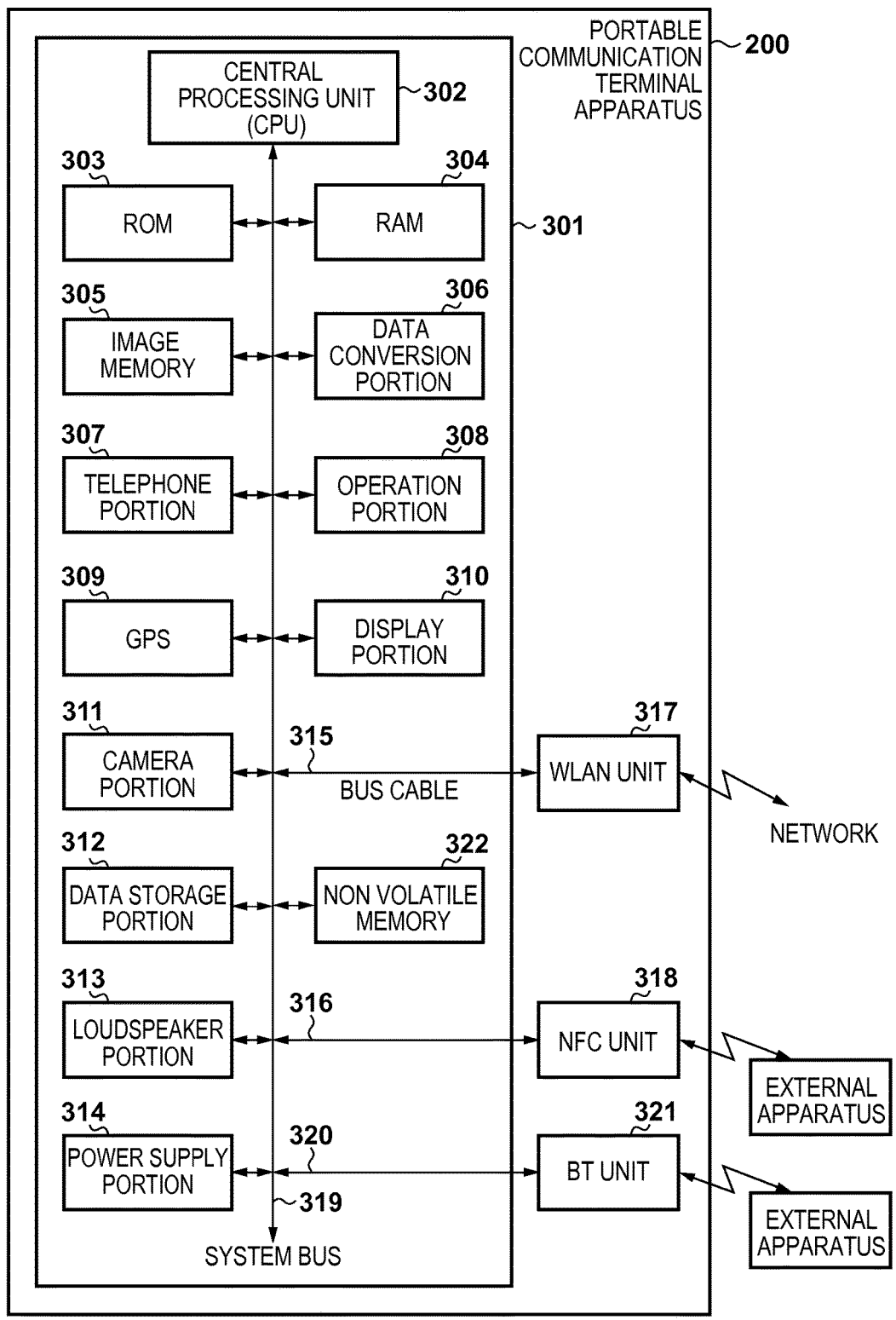
FIG. 3 is a block diagram showing the arrangement of the portable communication terminal apparatus.

FIG. 3 is a block diagram showing the arrangement of the portable communication terminal apparatus 200.

The portable communication terminal apparatus 200 includes a main board 301 for executing main control of the apparatus, a WLAN unit 317 for performing WLAN communication, an NFC unit 318 for performing NFC communication, and a BT unit 321 for performing Bluetooth® communication.

In the main board 301, a central processing unit (CPU) 302 is a system control portion, and controls the overall portable communication terminal apparatus 200. A ROM 303 stores control programs to be executed by the CPU 302, an embedded operating system (OS) program, and the like. In this embodiment, the respective control programs stored in the ROM 303 execute software control such as scheduling and task switching under the management of the embedded OS stored in the ROM 303.

A RAM 304 is implemented by a memory such as an SRAM (Static RAM), stores data such as program control variables, also stores data such as setting values registered by the user and management data of the portable communication terminal apparatus 200, and is allocated with various work buffer areas.

An image memory 305 is implemented by a memory such as a DRAM (Dynamic RAM), and temporarily stores image data received via a communication portion and those read out from a data storage portion 312 so as to be processed by the CPU 302. Note that the communication portion is a general term for communication functions including the WLAN unit 317, NFC unit 318, and BT unit 321.

A non volatile memory 322 is implemented by a memory such as a flash memory, and stores data to be saved even after power-off. Data to be saved in the non volatile memory 322 include, for example, an address book, mail history, incoming/outgoing call history, and information about devices connected in the past. Note that the memory structure is not limited to this. For example, the image memory 305 and the RAM 304 may share a memory, or data may be backed up in the data storage portion 312. In this embodiment, a DRAM is used as the image memory 305. However, the present invention is not limited to this since another storage medium such as a hard disk or a non volatile memory may be used.

A data conversion portion 306 executes analysis of a page description language (PDL) and the like, and data conversion such as color conversion and image conversion. A telephone portion 307 controls a telephone line, and implements telephone communication by processing audio data input/output via a loudspeaker portion 313. An operation portion 308 controls a signal from the operation portion 204 (FIG. 2). The operation portion 308 receives an operation as a signal from the power supply key 205 or the stylus housing discrimination switch 208, thereby executing control. A GPS (Global Positioning System) 309 acquires position information such as the current latitude and longitude. A display portion 310 electronically controls display contents of the display portion 203 (FIG. 2), allows various input operations, and can perform various display operations of status conditions and the like.

A camera portion 311 has a function of electronically recording and encrypting an image input via a lens. An image captured by the camera portion 311 is saved in the data storage portion 312. The data storage portion 312 can store data such as an image as a result of operating the operation portion 308 by an operation device such as the stylus 206, for example, stroke data such as characters and pictures drawn by the stylus 206. By executing the programs in the ROM 303 or the data conversion portion 306 for the data, it is possible to, for example, extract the features or peculiarity information of characters, or recognize handwritten characters. A practical example will be described later with reference to, for example, FIGS. 7 and 10.

The loudspeaker portion 313 implements a function of inputting or outputting a speech for a telephone function, and also an alarm notification function and the like. A power supply portion 314 incorporates a portable battery, and controls the battery. A power supply state includes a battery dead state in which the battery has no remaining amount, a power-off state in which the power supply key 205 is not pressed, an activation state in which the apparatus is normally active, and a power saving state in which the apparatus is active but is set in a power saving mode.

The portable communication terminal apparatus 200 incorporates three communication portions used to perform wireless communication, and can perform wireless communication by WLAN, NFC, and Bluetooth®. Thus, the portable communication terminal apparatus 200 performs data communication with another device such as an MFP. Each communication portion converts data into packets, and transmits the packets to the other device. Conversely, each communication portion converts packets coming from another external device into data, and transmits the data to the CPU 302. The WLAN unit 317, NFC unit 318, and BT unit 321 are connected to the main board 301 via bus cables 315, 316, and 320, respectively. The WLAN unit 317, NFC unit 318, and BT unit 321 are units each used to attain communication complying with its standard. The NFC unit will be described in detail later with reference to FIG. 4.

The respective components 303 to 314 and 322 of the main board 301 are connected to each other via a system bus 319 managed by the CPU 302.

Figure 4:
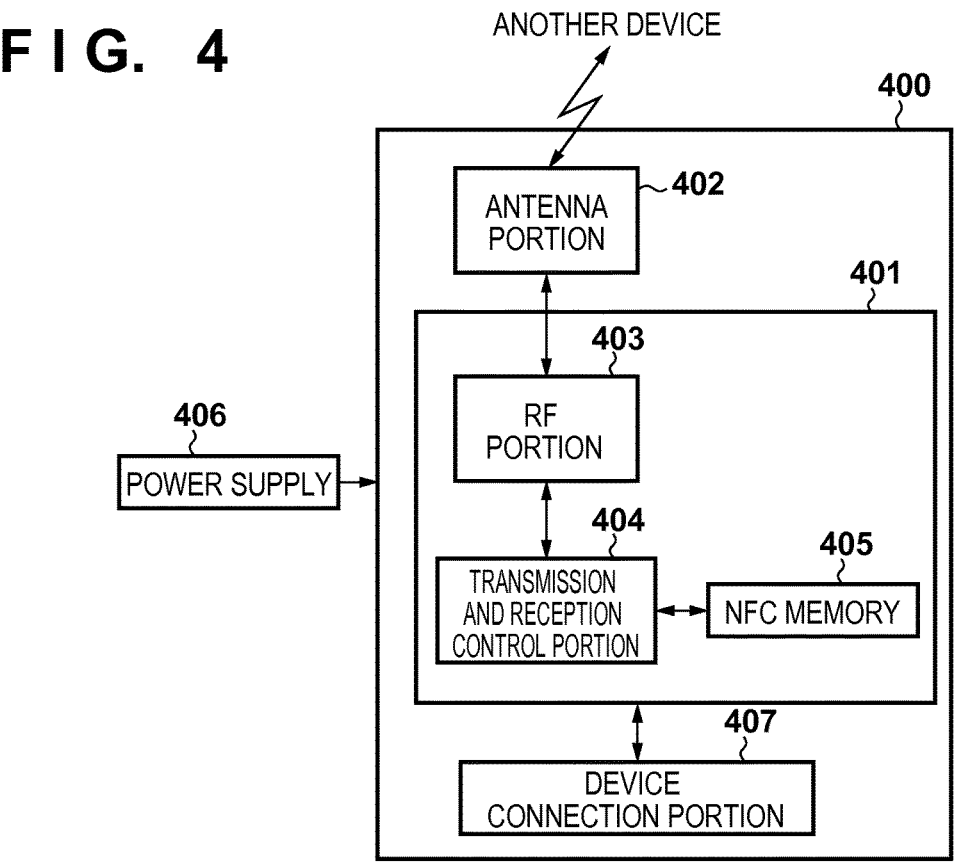
FIG. 4 is a block diagram showing the detailed arrangement of an NFC unit.

FIG. 4 is a block diagram showing details of an NFC unit used as the NFC unit 318.

The NFC unit 318 (FIG. 3) will be described as an NFC unit 400 with reference to FIG. 4. The NFC unit 400 includes an NFC controller portion 401, an antenna portion 402, and a device connection portion 407. The NFC controller portion 401 includes an RF portion 403, a transmission and reception control portion 404, and an NFC memory 405. The NFC unit 400 is connected to a power supply 406.

The antenna portion 402 receives radio waves and carriers from another NFC device (a device incorporating an NFC unit), and transmits radio waves and carriers to another NFC device. The RF portion 403 has a function of modulating/demodulating an analog signal to a digital signal. The RF portion 403 includes a synthesizer, and controls bands and channels based on frequency assignment data by identifying the frequencies of the bands and channels.

The transmission and reception control portion 404 executes control associated with transmission/reception, such as assembling and disassembling of a transmission/reception frame, appending and detection of a preamble, and identification of a frame. The transmission and reception control portion 404 also controls the NFC memory 405 to read/write various data and programs. When the NFC unit operates in the active mode in NFC communication, it receives power via the power supply 406 to communicate with a device via the device connection portion 407 and to communicate with another NFC device located within a communicable range by carriers transmitted/received via the antenna portion 402. When the NFC unit operates in the passive mode in NFC communication, it receives carriers from another NFC device via the antenna portion 402 to receive power from the other NFC device by electromagnetic induction, and transmits/receives data by performing communication with the other NFC device by modulating carriers.

Figure 15:
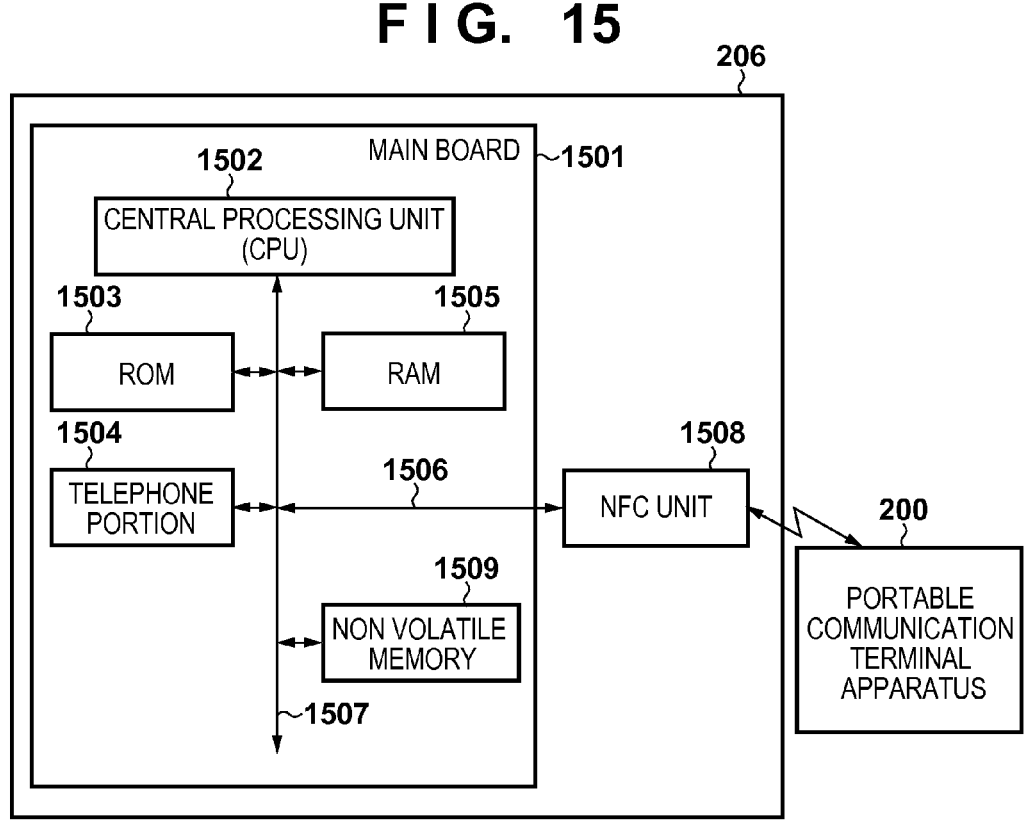
FIG. 15 is a block diagram showing the detailed arrangement of the stylus.

FIG. 15 is a block diagram showing the detailed arrangement of the stylus 206.

The stylus 206 includes a main board 1501 for executing main control of the apparatus, and an NFC unit 1508 for performing NFC communication.

In the main board 1501, a central processing unit (CPU) 1502 is a system control portion, and controls the overall stylus 206. A ROM 1503 stores control programs to be executed by the CPU 1502, an embedded operating system (OS) program, and the like. In this embodiment, the respective control programs stored in the ROM 1503 execute software control such as scheduling and task switching under the management of the embedded OS stored in the ROM 1503.

A RAM 1505 is implemented by a memory such as an SRAM (Static RAM), stores data such as program control variables, also stores data such as setting values registered by the user and management data of the stylus 206, and is allocated with various work buffer areas.

A non volatile memory 1509 is implemented by a memory such as a flash memory, and stores data to be saved even after power-off. Data to be saved even after power-off will be described in detail later.

The stylus 206 incorporates a communication portion for performing wireless communication, and includes the NFC unit 1508 capable of performing wireless communication by NFC. The NFC unit 1508 converts data into packets, and transmits the packets to another device. Conversely, the NFC unit 1508 converts packets coming from another external device into data, and transmits the data to the CPU 1502. The NFC unit 1508 is connected to the main board 1501 via a bus cable 1506. The NFC unit 1508 allows the stylus 206 to communicate with, for example, the portable communication terminal apparatus 200. The NFC unit 1508 is a unit used to attain communication complying with its standard. Details of the NFC unit 1508 are the same as those of the NFC unit 400 shown in FIG. 4 and a description thereof will be omitted.

A power supply portion 1504 switches ON/OFF of the power supply of the stylus 206. This enables the stylus 206 to implement both the passive mode and the active mode in NFC communication.

The respective components 1503 to 1505 and 1509 of the main board 1501 are connected to each other via a system bus 1507 managed by the CPU 1502.

Note that the arrangement of the stylus 206 is not limited to this as long as the portable communication terminal apparatus 200 and the stylus 206 can communicate to transmit/receive data.

Figure 5:
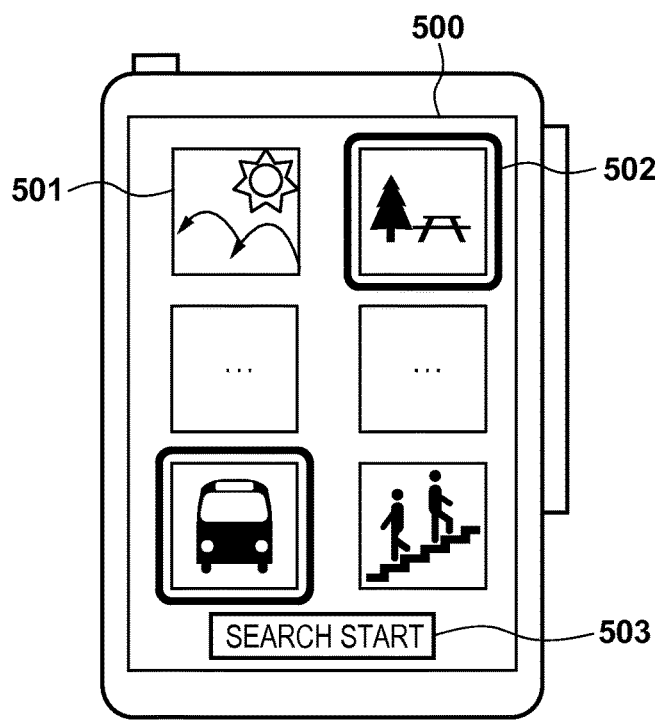
FIG. 5 is a view showing a case in which thumbnails of search candidate files are displayed on the portable communication terminal apparatus.

FIG. 5 is a view showing a case in which thumbnails of search candidate files are displayed on the display portion 203 of the portable communication terminal apparatus 200.

In an image search operation screen 500, thumbnails 501 are those of files saved in the portable communication terminal apparatus 200 or those of files saved in the server apparatus 101. When a thumbnail (image) as a search target is pressed, a focus 502 is displayed to indicate that the thumbnail has been selected as a search target. It may be possible to select a plurality of images as search targets, and a plurality of focuses 502 may exist on the display portion 203. When thumbnails cannot be displayed within one screen, they may be scrolled to be confirmed by the user. After selecting an image as a search target, the user presses a search start key 503 to execute an image search.

NFC communication will now be described. An apparatus which starts communication by outputting an RF (Radio Frequency) field when performing short distance wireless communication by an NFC unit will be referred to as an initiator. An apparatus which communicates with the initiator in response to an instruction issued by the initiator will be referred to as a target.

The communication mode of the NFC unit includes a passive mode and active mode. In the passive mode, a target responds to an instruction of an initiator by performing load modulation for an RF field generated by the initiator. On the other hand, in the active mode, the target responds to an instruction of the initiator by an RF field generated by the target itself.

FIGS. 6A to 6D are schematic views showing the passive mode and the active mode in NFC.

Figure 6A:
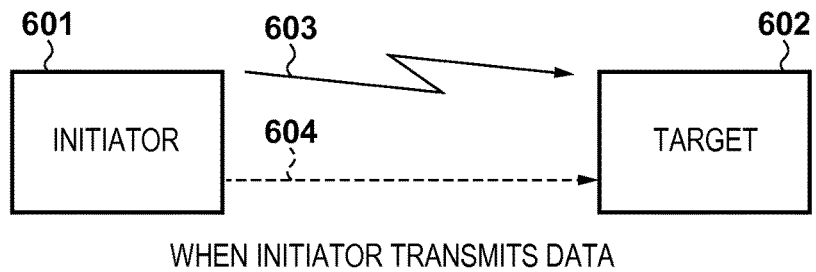
FIGS. 6A and 6B are schematic views each showing a passive mode in NFC communication.
Figure 6B:
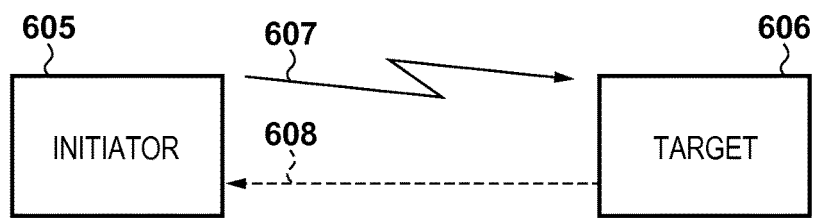
Figure 6C:
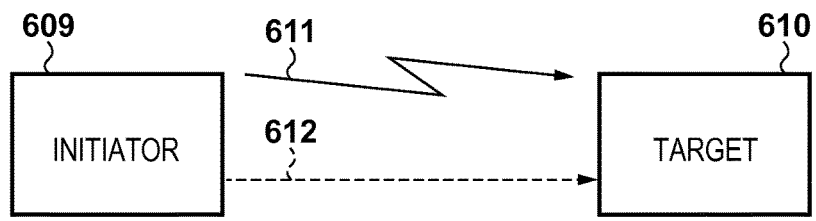
FIGS. 6C and 6D are schematic views each showing an active mode in NFC communication.
Figure 6D:
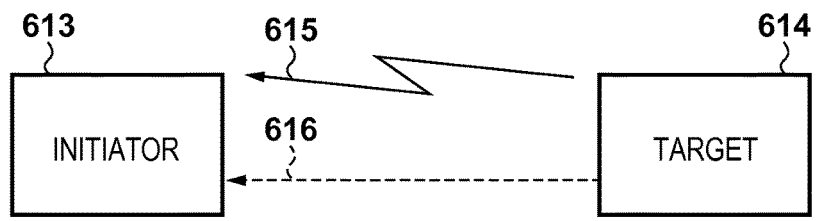

FIGS. 6A and 6B show the passive mode, and FIGS. 6C and 6D show the active mode.

As shown in FIG. 6A, when an initiator 601 transmits data 604 to a target 602 in the passive mode, it generates an RF field 603. The initiator 601 transmits the data 604 to the target 602 by modulating the RF field 603 by itself.

As shown in FIG. 6B, when a target 606 transmits data 608 to an initiator 605 in the passive mode, the initiator 605 generates an RF field 607, similarly to FIG. 6A. The target 606 transmits the data 608 to the initiator 605 by performing load modulation for the RF field 607. In data transmission by load modulation, the RF field from the initiator 605 causes a current to flow through the coil of the NFC unit serving as the target 606. The target 606 can use the current as power for data transmission. Consequently, even if no power is supplied to the NFC unit serving as the target 606, the NFC unit can perform data transmission complying with the NFC standard.

As shown in FIG. 6C, when an initiator 609 transmits data 612 to a target 610 in the active mode, it generates an RF field 611. The initiator 609 transmits the data 612 to the target 610 by modulating the RF field 611 by itself. Upon completion of data transmission, the initiator 609 stops outputting the RF field 611.

As shown in FIG. 6D, when a target 614 transmits data 616 to an initiator 613 in the active mode, it generates an RF field 615. The target 614 transmits the data 616 by the RF field 615 generated by itself. Upon completion of transmission, the target 614 stops outputting the RF field 615.

Figure 7A:
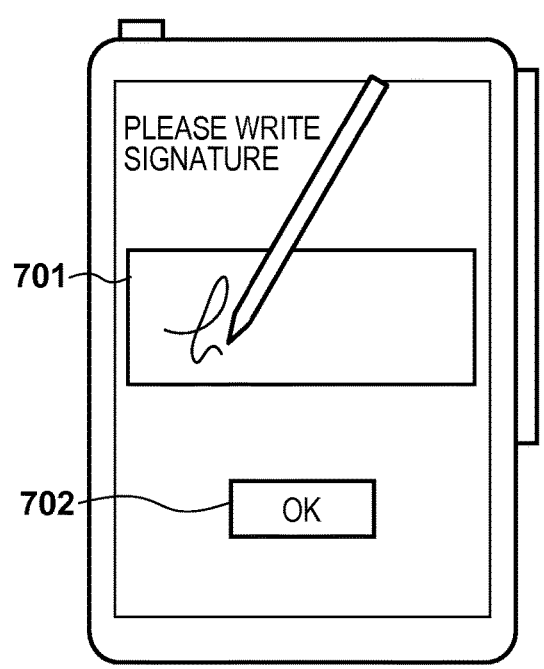
FIGS. 7A to 7C are views for explaining an example of a function implemented by using the portable communication terminal apparatus and a stylus.
Figure 7B:
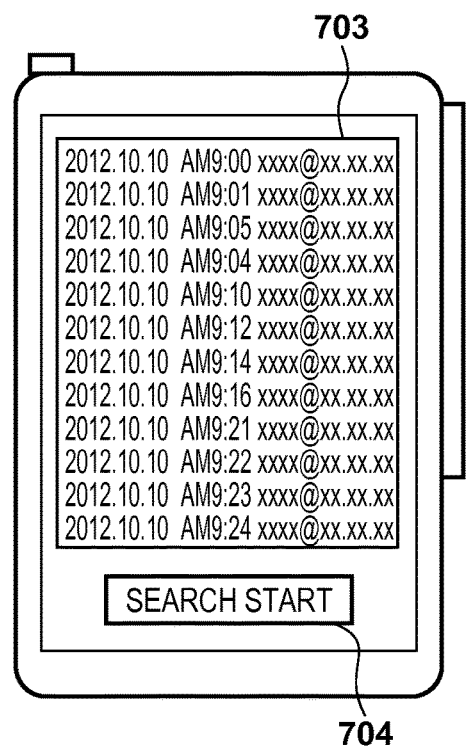
Figure 7C:
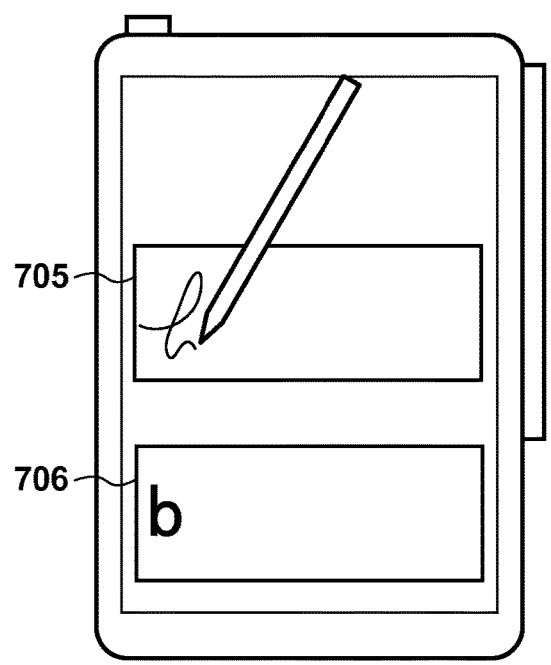

FIGS. 7A to 7C are views for explaining an example of a function implemented by using the portable communication terminal apparatus 200 and the stylus 206.

FIG. 7A shows a case in which a signature is input to the portable communication terminal apparatus 200 using the stylus 206 to perform authentication.

There are various methods of authenticating a signature. In this example, the user inputs a signature to a signature area 701 using the stylus 206, and authentication is performed based on the information. When a human actually writes characters, there are feature points of characters written by a human. In this example, a signature is authenticated using information of a signature image and feature point information of the signature of the user. The signature image and feature point information of the user are saved in advance in the non volatile memory 1509 of the stylus 206. When a signature is input to the signature area 701, the portable communication terminal apparatus 200 calculates feature point information of characters described by the stylus 206.

In this example, when an OK button 702 is pressed after inputting a signature, the portable communication terminal apparatus 200 performs authentication by comparing feature point information of the signature and a signature image which have been specified by calculation with those saved in the stylus 206. If a predetermined condition is satisfied, the portable communication terminal apparatus 200 authenticates the signature as a correct one; otherwise, the portable communication terminal apparatus 200 does not authenticate the signature as a correct one. If neither a signature image nor feature point information is saved in the stylus 206, the portable communication terminal apparatus 200 does not authenticate the signature as a correct one.

It is also possible to create data with a high recognition rate by merging the information used for recognition this time with information saved in the stylus 206, and save the created data in the stylus 206.

In this example, in addition to authentication performed by communication between the stylus 206 and the portable communication terminal apparatus 200, the signature input by the stylus 206 is compared with the signature information (the feature point information of the signature and the signature image) stored in the stylus 206 to perform authentication, thereby implementing a double authentication step. Note that this processing will be described in detail later with reference to FIG. 22.

FIG. 7B is a view for explaining a case in which a mail search is performed in the portable communication terminal apparatus 200 using the stylus 206. Note that FIG. 7B shows a case in which mail titles are displayed on the display portion 203 of the portable communication terminal apparatus 200.

The display portion 203 includes a mail display portion 703 and a search start key 704. The mail display portion 703 can display the titles of mail messages saved in the portable communication terminal apparatus 200. When the list of mail messages cannot be displayed within one screen, it may be scrolled to be confirmed. In this example, based on storage information saved in the stylus 206, it is possible to search for mail messages and view them. Predetermined storage information is saved in advance in the non volatile memory 1509 of the stylus 206. As a result of communicating the storage information stored in the stylus 206 with the portable communication terminal apparatus 200, the portable communication terminal apparatus 200 can consider the storage information as a search condition, and advance a mail search upon pressing of the search start key 704. That is, a refine image search can be executed using user information in the stylus 206. This method makes it possible to readily set a condition for a search by communicating the storage information in the stylus 206 and using it. Examples of the predetermined storage information are user information such as an address, and face information. Note that this processing will be described in detail later with reference to FIG. 23.

When one of a plurality of mail messages on the mail display portion 703 is selected and pressed without pressing the search start key, it is possible to view contents of the selected mail message. In this example, a refine image search can be executed. However, viewing contents of a mail message or replying to a mail message may also be restricted based on the user information in the stylus 206. For example, it may be possible to allow the user to reply to or view only a mail message with information which coincides with the user information or face information stored in the stylus 206.

FIG. 7C shows a case in which it is possible to input characters to the portable communication terminal apparatus 200 using the stylus 206.

The display portion 203 of the portable communication terminal apparatus 200 includes a handwriting recognition area 705 and a determination display area 706. The handwriting recognition area 705 is an area where characters input by the user by handwriting using the stylus 206 are recognized. The determination display area 706 displays characters (text) determined as a result of recognizing the characters input to the handwriting recognition area 705 by handwriting. In this example, similarly to the signature area 701 shown in FIG. 7A, when recognizing handwritten characters, the feature points of the characters are extracted. Note that feature point information of recognizable characters is saved in advance in the portable communication terminal apparatus 200.

When the user inputs characters to the handwriting recognition area 705 by handwriting using the stylus 206, the feature points of the input characters (operation contents) are extracted, and the portable communication terminal apparatus 200 performs calculation, thereby recognizing the characters. In this example, feature point information of the characters of the user and correction information corresponding to the feature point information are saved in advance in the non volatile memory 1509 of the stylus 206. It is then possible to recognize characters more accurately based on feature point information of characters specified by calculation of the portable communication terminal apparatus 200 and the feature point information saved in the stylus 206. If characters are recognized using the stylus 206, it is possible to correct the feature points of the characters based on the information stored in the stylus 206 when the portable communication terminal apparatus 200 extracts the feature points. It is possible to obtain a more accurate result at the time of character recognition by managing, in the stylus 206, feature point information which changes depending on the environment in which the stylus is used, such as different peculiarities or cultures of individuals, and performing correction.

As described above, it is possible to convert handwritten characters into text and input it. The flowchart of FIG. 22 (to be described later) indicates signature authentication processing. The processing in FIG. 7C can be implemented by replacing a signature in FIG. 22 by characters.

Figure 8A:
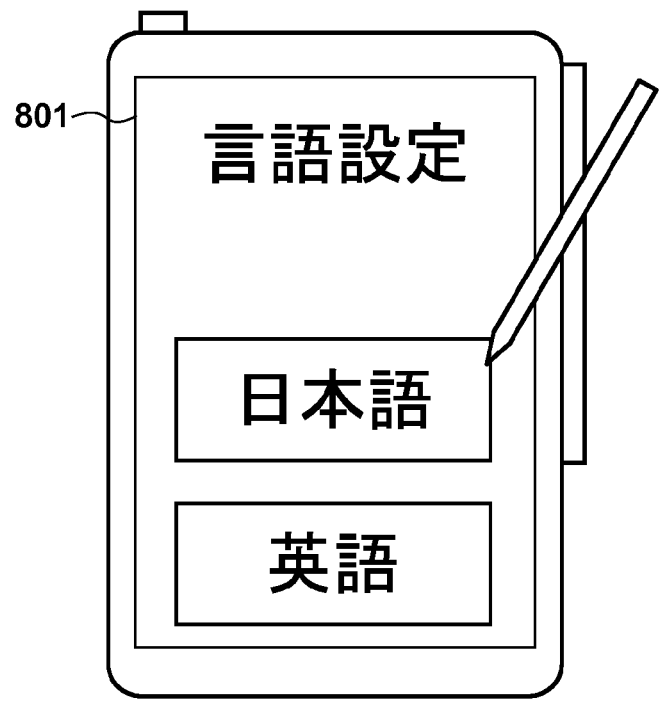
FIGS. 8A and 8B are views for explaining a case in which a language is switched by using the stylus in the portable communication terminal apparatus.
Figure 8B:
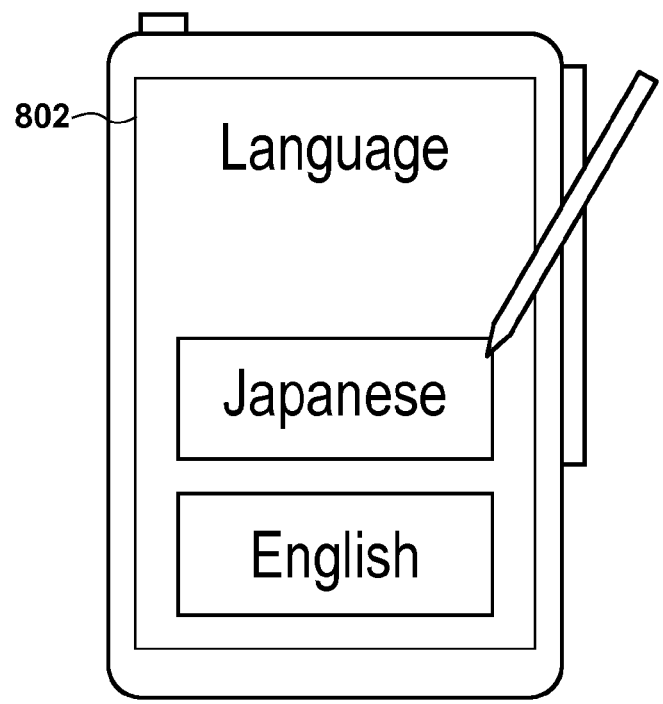

FIGS. 8A and 8B are views for explaining a case in which a plurality of kinds of display languages are switched using the stylus 206 in the portable communication terminal apparatus 200.

In this example, language information of a language to be used is preset in the stylus 206. FIG. 8A shows a language setting screen 801 displayed on the display portion 203 when language setting of Japanese is made in the stylus 206. On the other hand, FIG. 8B shows a language setting screen 802 displayed on the display portion 203 when language setting of English is made in the stylus 206. The user can switch the language setting (in this example, between Japanese and English) using the language setting screen 801 or 802. When the language setting is switched, the language information of the stylus 206 may be switched in addition to the portable communication terminal apparatus 200. This processing can be implemented by replacing mode switching in the flowchart of FIG. 24 by language setting switching, and will be described in detail later.

Figure 9A:
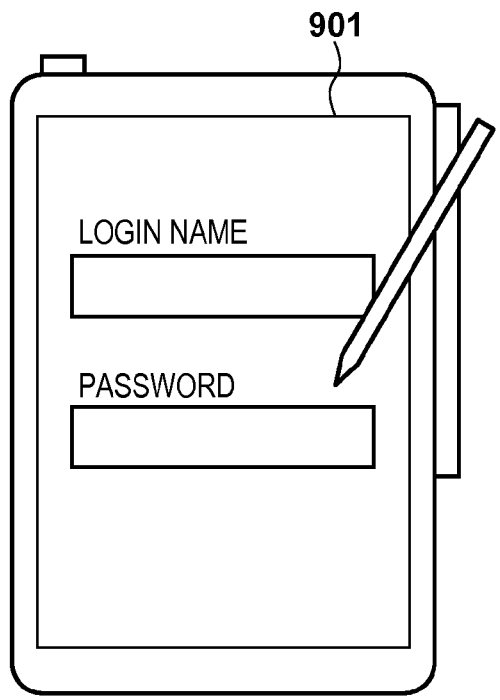
FIGS. 9A to 9C are views each showing an example of the screen of the portable communication terminal apparatus.
Figure 9B:
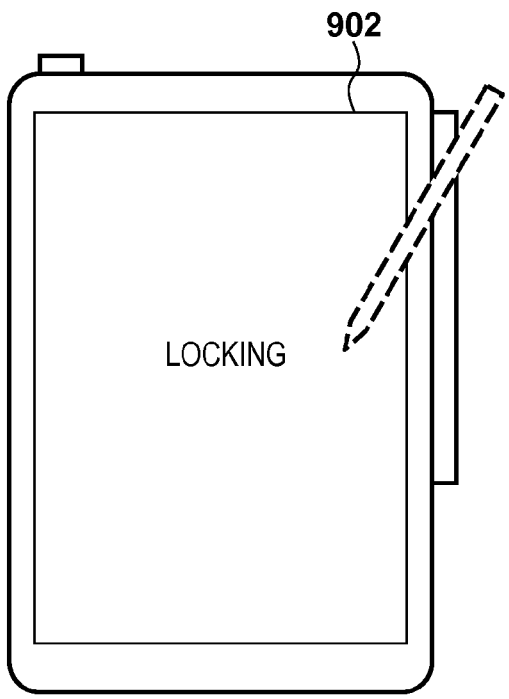
Figure 9C:
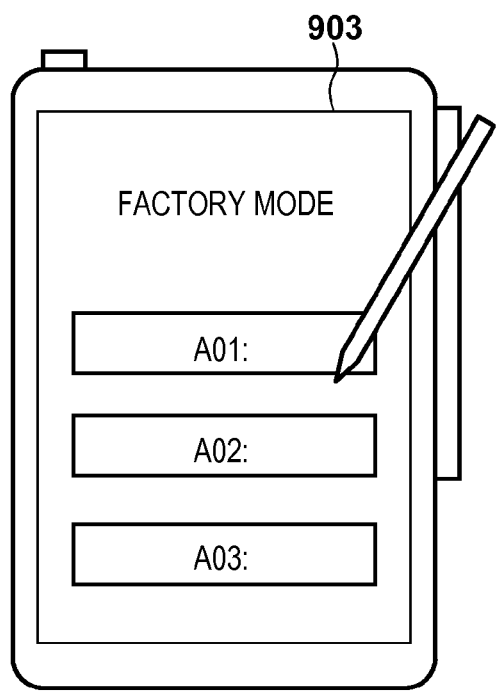

FIGS. 9A to 9C are views each showing an example of the screen of the portable communication terminal apparatus 200. In this example, when the stylus 206 performs authentication, the screen is displayed in a predetermined mode. If, for example, predetermined mode information set in the stylus 206 coincides with one of pieces of mode information saved in the portable communication terminal apparatus 200, the screen of a corresponding mode is displayed. Note that mode information is information indicating each of a plurality of kinds of operation modes of the portable communication terminal apparatus 200 including a normal mode (user mode) and factory mode. The mode information is saved in the stylus 206, and can be set, as needed.

FIG. 9A shows a normal screen 901 which is displayed on the display portion 203 and indicates the normal mode (user mode). The normal screen 901 is displayed in a state in which authentication using the stylus 206 with mode information is in progress. Note that the state in which authentication is in progress indicates a state in which communication between the stylus 206 and the portable communication terminal apparatus 200 is in progress. In this example, the normal screen 901 displays a login screen. However, the normal screen is not limited to this, and may be a screen operable by the user.

FIG. 9B shows a case in which no authentication is executed using the stylus 206. In this example, since communication with the stylus 206 is not in progress, a lock screen 902 indicating a lock state is displayed. Note that in this example, when communication with the stylus 206 is not in progress, the lock screen indicating the lock state is displayed. However, the screen displayed when communication is not in progress is not limited to this. The lock screen 902 need only be different from the normal screen shown in FIG. 9A.

FIG. 9C shows a factory screen 903 which is displayed on the display portion 203 and indicates the factory mode. The factory mode indicates a mode which cannot be basically used by a general user, and is used by the manufacturer of the portable communication terminal apparatus 200 at the timing of, for example, checking in the factory before shipping. In the factory mode, for example, the initial values of the portable communication terminal apparatus 200 can be set. An operation of switching between the factory mode and the normal mode is implemented by a sequence shown in FIG. 24, and will be described in detail later.

In this example, the mode information of the stylus 206 is set to the factory mode in the initial state before shipping from the factory. When various operations such as checking before shipping to the factory screen 903 are complete and, for example, an instruction indicating a shipping enable state is input, the mode can be set from the factory mode to the normal mode.

FIGS. 10A to 10E are views showing a case in which while the portable communication terminal apparatus 200 is operated using the stylus 206, the behavior changes depending on an elapsed time.

FIG. 10A shows a screen 1001 displayed on the display portion 203. The screen 1001 is a screen indicating a state in which the operation screen can be operated after communication between the portable communication terminal apparatus 200 and the stylus 206 is ensured and authentication is completed. The screen 1001 corresponds to the normal screen 901 shown in FIG. 9A.

FIG. 10B shows an operation screen 1002 in a login state, that is, the operation screen 1002 to which an actual operation is performed after login processing is performed. FIG. 10C shows a screen 1003 indicating a state in which the stylus 206 is released while the operation screen 1002 shown in FIG. 10B is operated, and thus it becomes impossible to ensure communication. The screen 1003 corresponds to the lock screen 902 shown in FIG. 9B.

FIGS. 10D and 10E respectively show operation screens 1004 and 1005 which are displayed depending on an elapsed time after it becomes impossible to ensure communication, when communication is ensured after it becomes impossible to ensure communication. In this embodiment, when communication is ensured and returned within the first predetermined time (for example, 5 sec) after it becomes impossible to ensure communication, it is possible to continue the operation by returning to the operation screen 1004 which is the same as that shown in FIG. 10B, as shown in FIG. 10D.

On the other hand, when the operation is returned the first predetermine time after it becomes impossible to ensure communication, the screen returns to the screen 1005 shown in FIG. 10E. In this case, as shown in FIG. 10A, logoff processing is performed in the login state to return to a state in which authentication is performed again.

As described above, depending on an elapsed time after the stylus 206 is released and it becomes impossible to ensure communication, a different screen may be set to return to the operation. This processing will be described in detail later with reference to FIG. 19.

FIGS. 11A to 11D are views showing a case in which automatic login processing is performed for the portable communication terminal apparatus 200 by using the stylus 206. In this example, automatic login processing is performed based on the user information saved in the stylus 206.

Figure 11A:
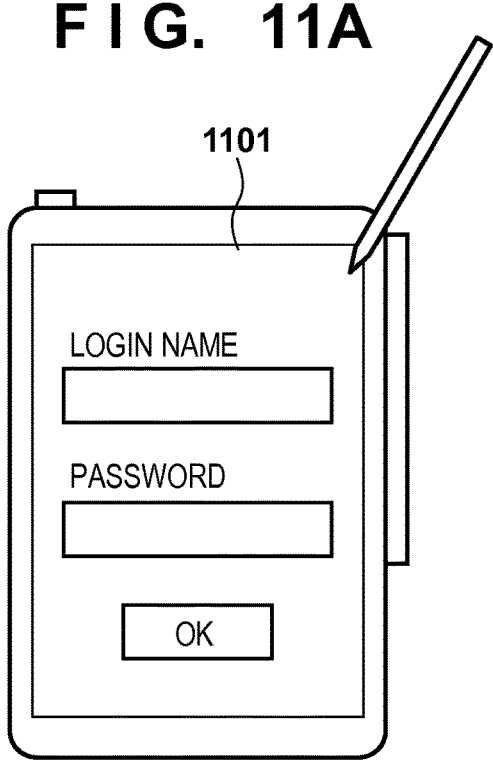
FIGS. 11A to 11D are views showing a case in which automatic login processing is performed for the portable communication terminal apparatus by using the stylus.

FIG. 11A shows a login screen 1101 displayed on the display portion 203. When no communication is established with the stylus 206, the login screen 1101 is not displayed.

Figure 11B:
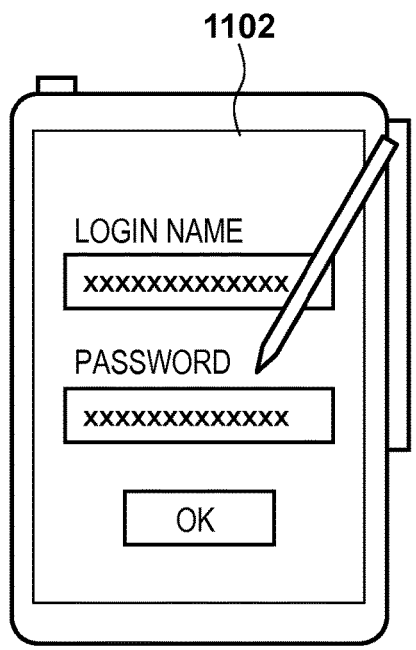

When communication is established with the stylus 206, the login screen 1101 is displayed. FIG. 11B shows a screen 1102 displayed on the display portion 203 when a login name and password are automatically input. When the stylus 206 enters within a given distance during communication, the user information, that is, the login name and password in this example, stored in the stylus 206 are automatically transmitted to the portable communication terminal apparatus 200, and input to the screen 1102 as input data. In this state, login processing can be performed by pressing an OK button.

Figure 11C:
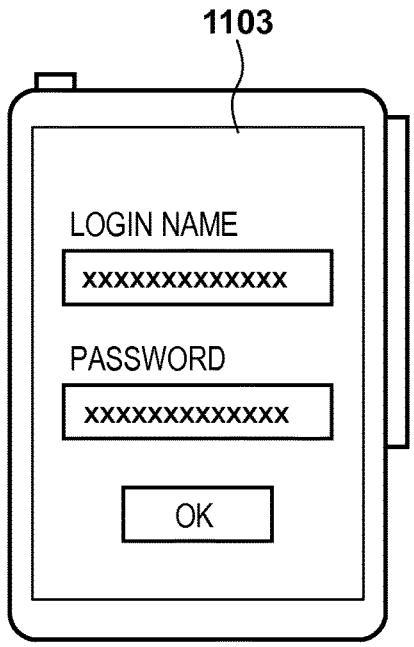

On the other hand, FIG. 11C shows a screen 1103 displayed when the login name and password are input upon pressing of an OK button, unlike FIG. 11B. The difference from FIG. 11B is that the login name and password stored in the stylus 206 are input to the screen 1103 only after both conditions that the stylus 206 exists within a given distance range of the portable communication terminal apparatus 200 and that the OK button is pressed are satisfied. In FIG. 11C, the timing when data is transmitted to the portable communication terminal apparatus 200 is later than that in FIG. 11B. In either case, however, login processing can be performed without requiring the user to input the login name and password.

Figure 11D:
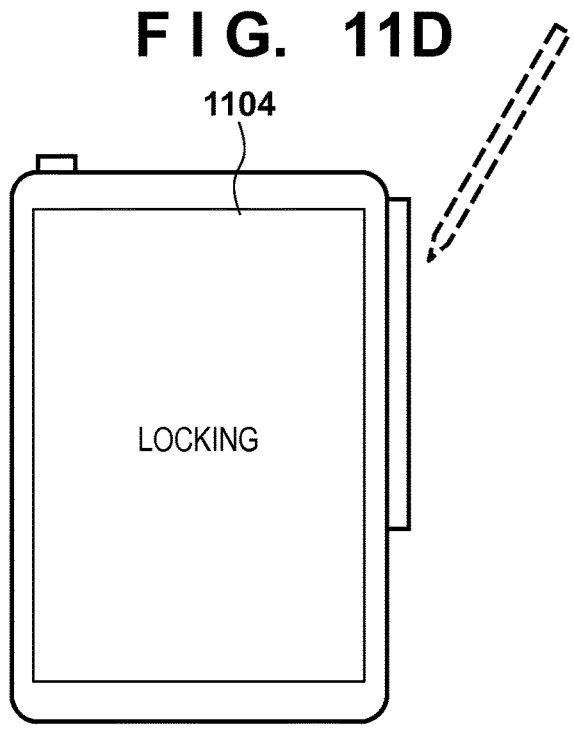

FIG. 11D shows a screen 1104 displayed on the display portion 203 when no communication is established between the portable communication terminal apparatus 200 and the stylus 206, for example, when the stylus 206 is released from the portable communication terminal apparatus 200. In this case, as indicated by the screen 1104, the state transits to the lock state, thereby disabling the operation. The above processing will be described in detail later with reference to FIGS. 17 and 18.

FIGS. 12A to 12C are views showing a case in which a display image is enlarged using the stylus 206 in the portable communication terminal apparatus 200.

FIG. 12A shows a screen 1201 displayed on the display portion 203 when no communication is established between the portable communication terminal apparatus 200 and the stylus 206, for example, when it becomes impossible to ensure communication by releasing the stylus 206 from the portable communication terminal apparatus 200. In this case, the state transits to the lock state, as indicated by the screen 1201, thereby disabling the portable communication terminal apparatus 200 from being operated.

FIG. 12B shows a screen 1202 displayed when communication between the stylus 206 and the portable communication terminal apparatus 200 is in progress. In this case, if communication is established as indicated by the screen 1202, an image search screen is displayed. In the screen 1202, thumbnails are those of files saved in the portable communication terminal apparatus 200 or those of files saved in the server apparatus 101. When an image as a search target is selected and a search start key is pressed, an image search is executed.

FIG. 12C shows an operation screen 1203 displayed when the portable communication terminal apparatus 200 is operated using the stylus 206. When an operation is performed using the stylus 206, the operation screen 1203 in which some contents of the screen 1202 are enlarged is displayed. In this example, a case is shown in which some contents are enlarged only when an operation is performed using the stylus 206 and the stylus 206 enters within a given distance (zoom distance). In this embodiment, when the stylus 206 enters within the zoom distance, for example, when the stylus 206 enters a region of a predetermined thumbnail, the thumbnail is enlarged and displayed. When a thumbnail (image) as a search target is pressed, a focus is displayed to indicate that the thumbnail has been selected as a search target. In this example, the selected thumbnail is enlarged. Instead of enlarging the thumbnail, a predetermined region and the remaining region may be identifiably displayed by changing the display mode such as magnification including enlargement/reduction, highlighting of the predetermined region in the operation screen, or blinking display.

Figure 13:
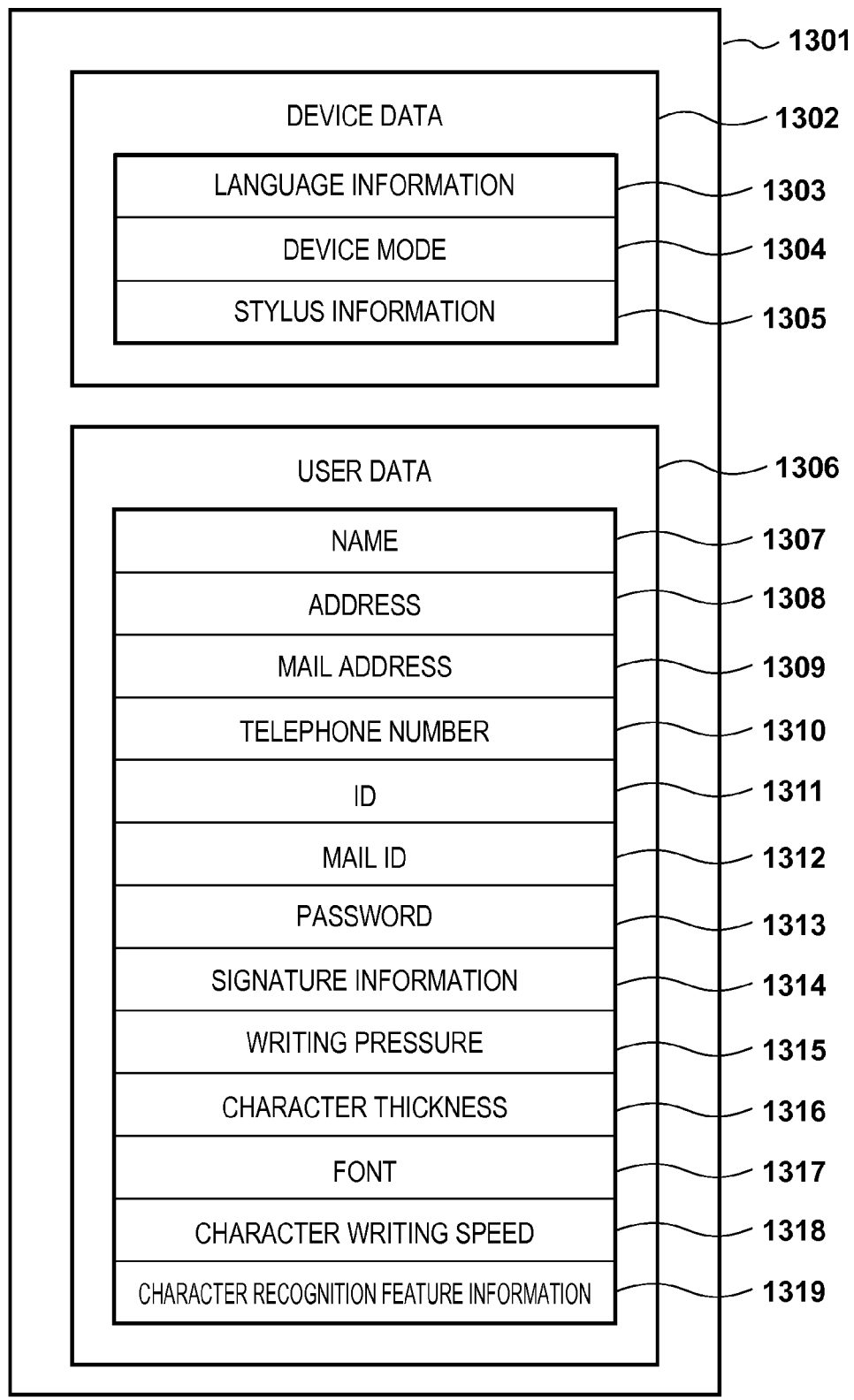
FIG. 13 is a view showing the structure of the nonvolatile memory of the stylus.

FIG. 13 is a view showing the structure of the non volatile memory 1509 of the stylus 206.

Reference numeral 1301 denotes an entire storage area of the non volatile memory 1509. The non volatile memory 1509 includes device data 1302 and user data 1306. The device data 1302 stores data influencing the behavior of a device operated by the stylus 206. Examples of the device data 1302 are language information 1303, a device mode 1304, and stylus information 1305. Note that not all of these pieces of information need be held as the device data 1302, and other device data may be held. The device mode 1304 is mode information, and includes the operation mode of the device such as the user mode or factory mode. The stylus information 1305 is stylus information indicating the stylus 206 which has been used to operate the portable communication terminal apparatus 200.

The user data 1306 stores data associated with the user of the stylus 206. Example of the user data 1306 are a name 1307, address 1308, mail address 1309, telephone number 1310, ID 1311, mail ID 1312, password 1313, signature information 1314, writing pressure 1315, character thickness 1316, font 1317, character writing speed 1318, and character recognition feature information 1319. Note that not all of these pieces of information need be held as the user data 1306, and other user data may be held.

In this embodiment, a case in which the user data 1306 are managed is exemplified by assuming that one user uses one stylus. The present invention, however, is not limited to this and any information which can be managed by the stylus 206 is possible. Similarly, the portable communication terminal apparatus 200 stores the device data and user data shown in FIG. 13. When the portable communication terminal apparatus 200 has the same arrangement as that of the stylus 206, it is possible to exchange information between the stylus 206 and the portable communication terminal apparatus 200.

Figure 14:
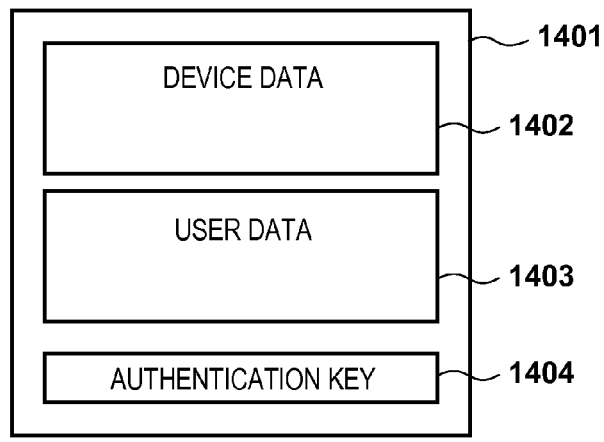
FIG. 14 is a view showing the structure of the NFC memory of the portable communication terminal apparatus.

FIG. 14 is a view showing the structure of the NFC memory 405 of the portable communication terminal apparatus 200.

Reference numeral 1401 denotes an entire storage area of the NFC memory 405 of the portable communication terminal apparatus 200. The NFC memory 405 stores device data 1402 and user data 1403. Details of these data are the same as those of the device data 1302 and user data 1306 stored in the non volatile memory of the stylus 206 of FIG. 13. Note that the portable communication terminal apparatus 200 need not store all of the user data stored in the stylus 206. For example, only the stylus 206 needs to store the mail ID 1312 and password 1313 as information necessary for user login, information used for automatic input, and the like.

In this example, the NFC memory 405 includes an authentication key 1404. With this arrangement, even if the battery of the portable communication terminal apparatus 200 has no remaining amount, when the portable communication terminal apparatus 200 serves as a target in the passive mode to perform communication, it is possible to read/write data from/in the NFC memory 405 by performing authentication using the authentication key 1404 according to a predetermined procedure.

Note that the NFC memory of the stylus 206, which is not shown in FIG. 15, has the same arrangement, and stores the same data contents (or a copy of the device data 1302 and user data 1306 stored in the non volatile memory of the stylus 206) as those of the device data 1402 and user data 1403. Even if the battery of the stylus 206 has no remaining amount, when the stylus 206 serves as a target in the passive mode to perform communication, it is possible to read/write data from/in the NFC memory of the stylus 206 by performing authentication using the authentication key 1404 according to a predetermined procedure.

Figure 16:
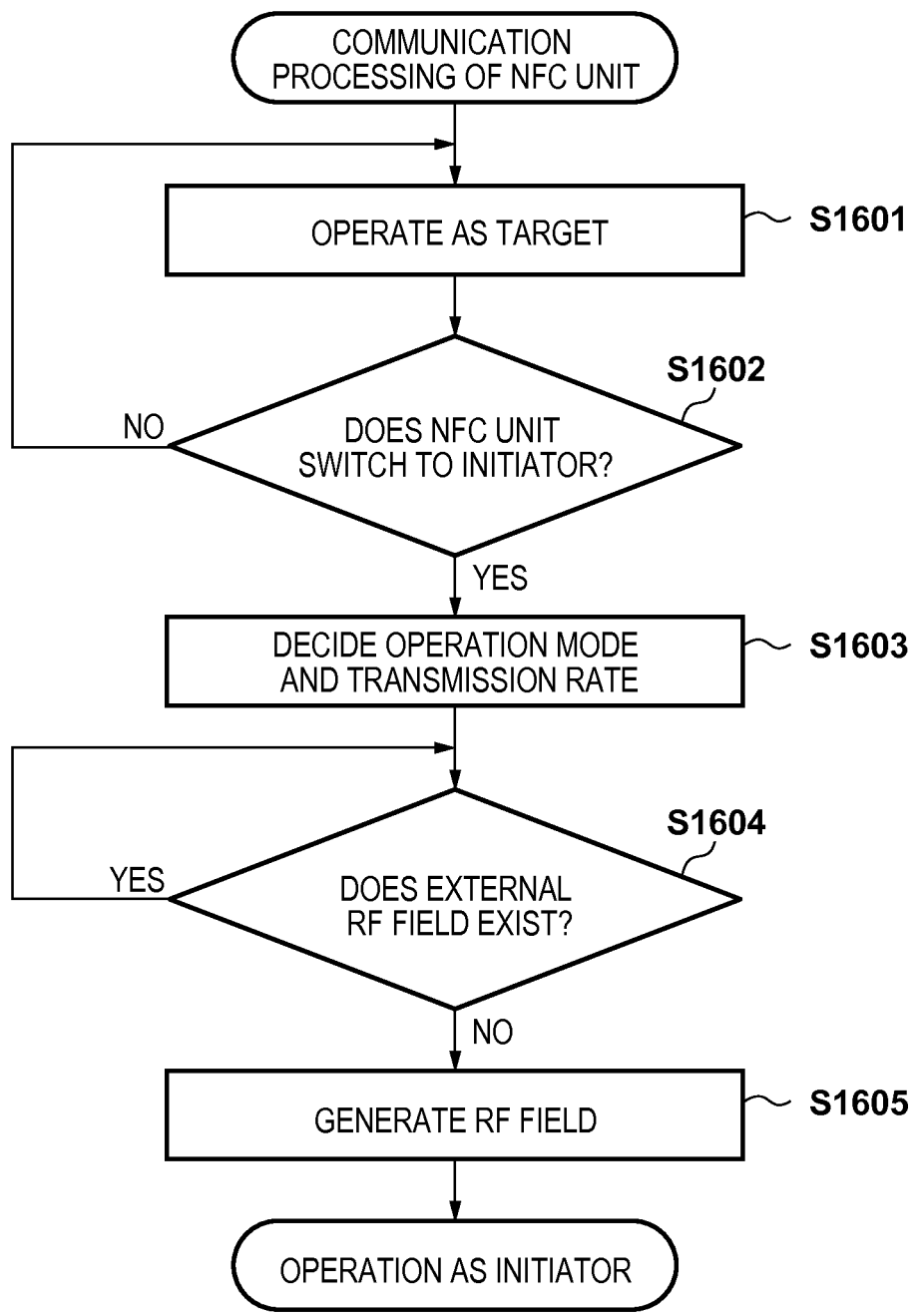
FIG. 16 is a flowchart for the NFC unit to operate as an initiator.

FIG. 16 is a flowchart for the NFC unit to operate as an initiator.

First, in step S1601, every NFC unit 400 (the NFC unit 318 of the portable communication terminal apparatus 200 and the NFC unit 1508 of the stylus 206) operates as a target, and stands by for an instruction from an initiator. In this state, the NFC unit 400 can switch to an initiator in response to a request from an application for controlling communication complying with the NFC standard. In step S1602, the NFC unit 400 determines whether to switch to an initiator. That is, it is determined whether the application has requested the NFC unit 400 to switch to an initiator. If the NFC unit 400 determines not to switch to an initiator (NO in step S1602), the process returns to step S1601. On the other hand, if the NFC unit 400 determines to switch to an initiator in response to a request for the NFC unit 400 to switch to an initiator (YES in step S1602), the process advances to step S1603.

If the NFC unit 400 responds to the request to switch to an initiator, in step S1603 the application of the NFC unit 400 selects the active mode or passive mode, and decides a transmission rate. In step S1604, the NFC unit 400 serving as an initiator detects the existence of an external RF field output by an apparatus other than the self apparatus. That is, it is determined whether an external RF field exists. If an external RF field exists (YES in step S1604), the initiator stands by until no RF field is detected without generating a self RF field; otherwise (NO in step S1604), the process advances to step S1605, and the NFC unit 400 serving as an initiator generates a self RF field. Through the above processing steps, the NFC unit 400 starts an operation as an initiator.

Figure 17:
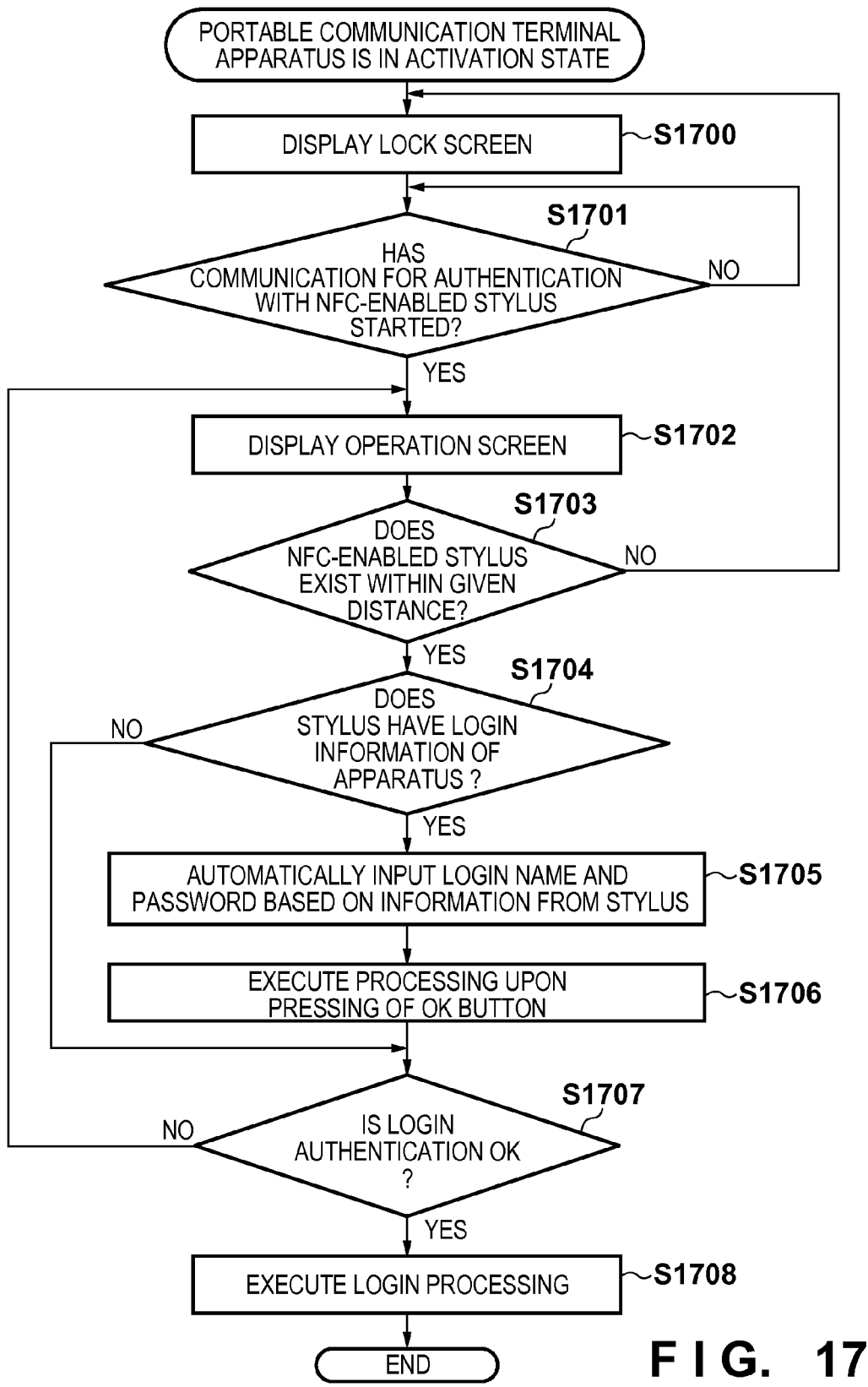
FIG. 17 is a flowchart illustrating automatic login processing.

FIG. 17 is a flowchart illustrating automatic login processing.

Note that processing shown in FIG. 17 is implemented when the CPU 302 of the portable communication terminal apparatus 200 reads out a program stored in the ROM 303, and executes it. The processing of FIG. 17 particularly indicates a case in which the automatic login processing in FIG. 11B is executed.

In step S1700, the CPU 302 displays the lock screen indicating the operation mode when the apparatus is in a non-communication state with the stylus 206. In step S1701, the CPU 302 determines whether communication for authentication with the NFC-enabled stylus 206 has started. If it is determined that communication has started (YES in step S1701), the process advances to step S1702. Note that if it is not determined that communication has started (NO in step S1701), the CPU 302 stands by until it is determined that communication has started. In step S1702, the CPU 302 displays the login screen (FIG. 11B).

In step S1703, the CPU 302 determines whether the NFC-enabled stylus exists within a given distance. If no stylus exists within the given distance (NO in step S1703), the process returns to step S1700; otherwise (YES in step S1703), the process advances to step S1704.

In step S1704, the CPU 302 determines information stored in the stylus 206, and then determines whether the stylus is a stylus having login information (login name and password) of the portable communication terminal apparatus 200. If the stylus has no login information (NO in step S1704), the process advances to step S1706; otherwise (YES in step S1704), the process advances to step S1705.

In step S1705, the CPU 302 receives the login information (login name and password) stored in the stylus 206, and automatically inputs the login name and password to the input areas of the login screen (FIG. 11B).

In step S1706, the CPU 302 performs processing upon pressing of the OK button. In this embodiment, login authentication processing corresponds to the processing upon pressing of the OK button (a predetermine button operation). In step S1707, the CPU 302 determines whether login authentication is OK. If login authentication is not OK (NO in step S1707), the process returns to step S1702; otherwise (YES in step S1707), the process advances to step S1708 to execute login processing.

Note that if the stylus 206 has no login information of the portable communication terminal apparatus 200, the user manually inputs the login name and password to the input areas (FIG. 11B) of the portable communication terminal apparatus 200. After that, the processing in step S1706 is executed.

Figure 18:
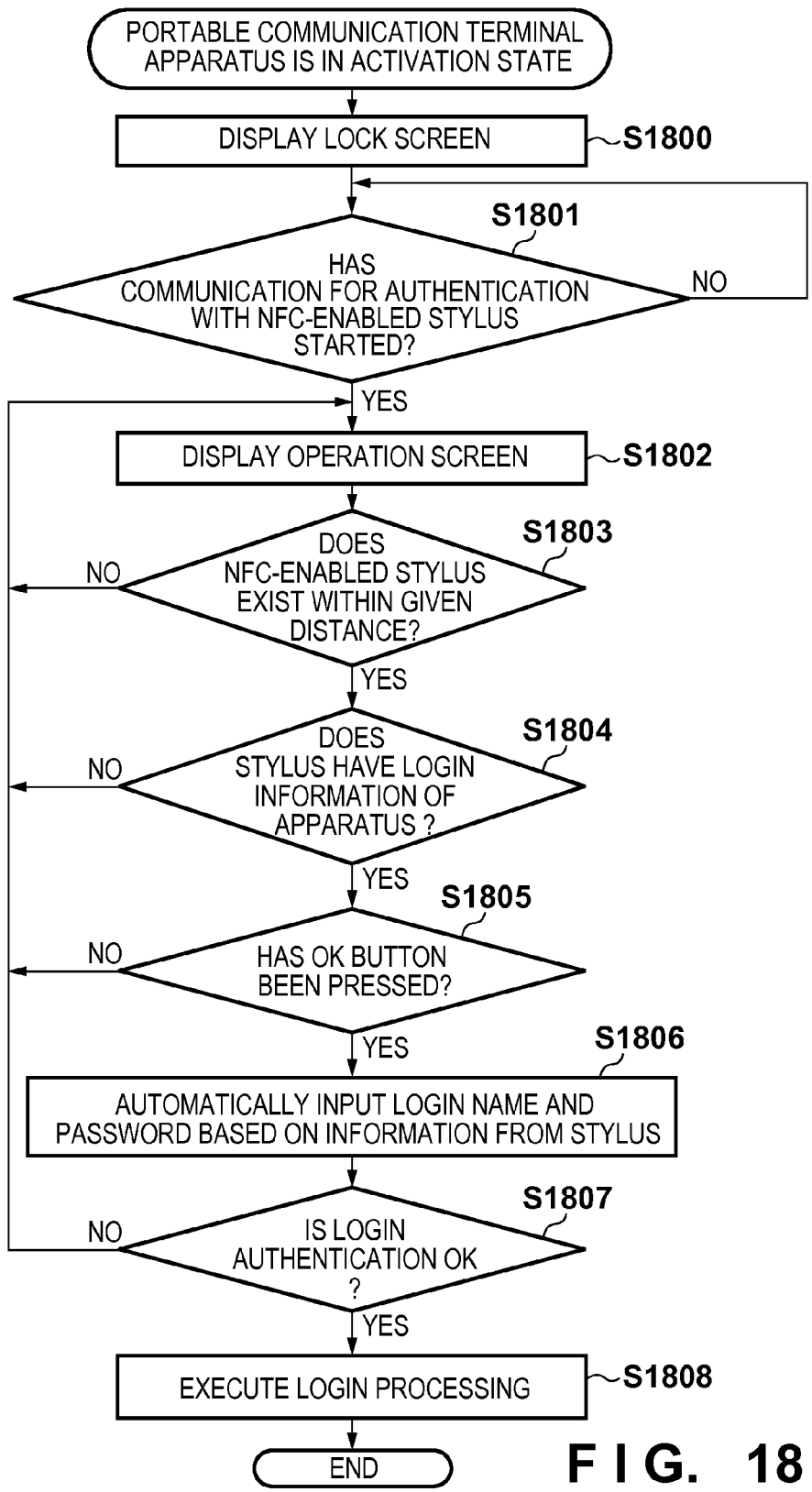
FIG. 18 is a flowchart illustrating another example of the automatic login processing.

FIG. 18 is a flowchart illustrating another example of the automatic login processing.

Note that processing shown in FIG. 18 is implemented when the CPU 302 of the portable communication terminal apparatus 200 reads out a program stored in the ROM 303, and executes it. The processing of FIG. 18 particularly indicates a case in which the automatic login processing in FIG. 11C is executed.

In step S1800, the CPU 302 displays the lock screen indicating the operation mode when the apparatus is in a non-communication state with the stylus 206. In step S1801, the CPU 302 determines whether communication for authentication with the NFC-enabled stylus 206 has started. If it is determined that communication has started (YES in step S1801), the process advances to step S1802. Note that if it is not determined that communication has started (NO in step S1801), the CPU 302 stands by until it is determined that communication has started. In step S1802, the CPU 302 displays the login screen (FIG. 11C).

In step S1803, the CPU 302 determines whether the NFC-enabled stylus 206 exists within a given distance. If no stylus 206 exists within the given distance (NO in step S1803), the process returns to step S1800; otherwise (YES in step S1803), the process advances to step S1804.

In step S1804, the CPU 302 determines information stored in the stylus 206, and then determines whether the stylus is a stylus having login information (login name and password) of the portable communication terminal apparatus 200. If the stylus has no login information (NO in step S1804), the process returns to step S1802; otherwise (YES in step S1804), the process advances to step S1805.

In step S1805, it is determined whether the OK button has been pressed. If the OK button has not been pressed (NO in step S1805), the process returns to step S1802; otherwise (YES in step S1805), the process advances to step S1806.

In step S1806, the CPU 302 receives the login information (login name and password) stored in the stylus 206, and automatically inputs the login name and password to the input areas of the login screen (FIG. 11C).

In step S1807, the CPU 302 determines whether login authentication is OK. If login authentication is not OK (NO in step S1807), the process returns to step S1802; otherwise (YES in step S1807), the process advances to step S1808 to execute login processing. The process then ends.

Figure 19:
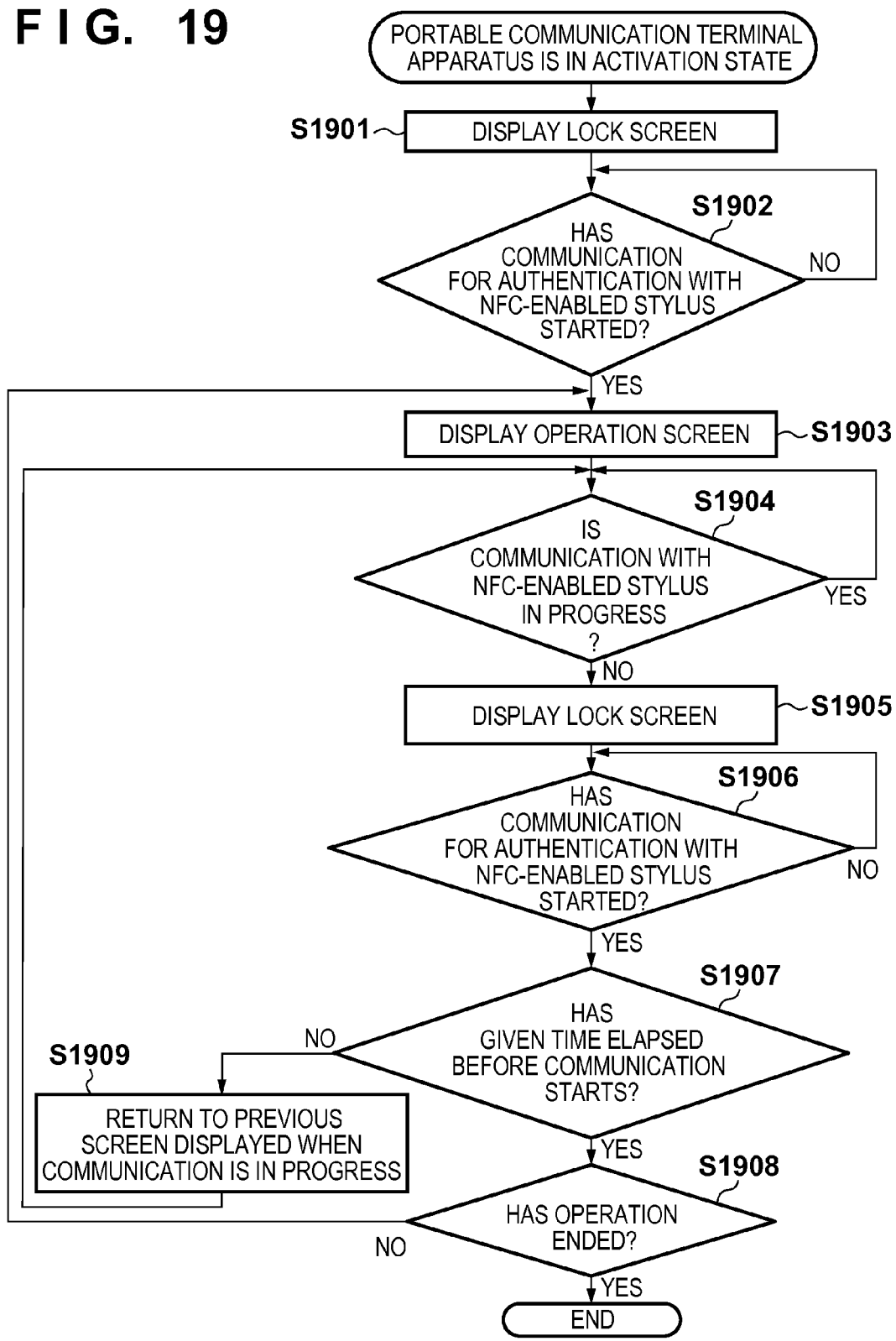
FIG. 19 is a flowchart illustrating processing when the stylus is released for a given time while an operation is performed using the stylus.

FIG. 19 is a flowchart illustrating processing when the stylus 206 is released for a given time while the stylus 206 is used to perform an operation.

Note that processing shown in FIG. 19 is implemented when the CPU 302 of the portable communication terminal apparatus 200 reads out a program stored in the ROM 303, and executes it. The processing of FIG. 19 particularly indicates a case in which the processing in FIGS. 10A to 10E is executed.

In step S1901, the CPU 302 displays the lock screen (FIG. 10C) indicating an operation mode when the apparatus is in a non-communication state with the stylus 206. In this case, the CPU 302 changes not only the screen but also the internal behavior accordingly. In step S1902, the CPU 302 determines whether communication for authentication with the NFC-enabled stylus 206 has started. If it is determined that communication for authentication with the NFC-enabled stylus 206 has started (YES in step S1902), the process advances to step S1903; otherwise (NO in step S1902), the CPU 302 stands by until communication starts.

In step S1903, upon completion of authentication, the CPU 302 changes the displayed screen to the operation screen (FIG. 10B). In step S1904, the CPU 302 determines whether communication with the NFC-enabled stylus is in progress. In other words, the CPU 302 determines in step S1904 whether communication with the stylus has been interrupted. If communication is in progress (YES in step S1904), this processing continues until communication is interrupted; otherwise (NO in step S1904), the process advances to step S1905.

In step S1905, the CPU 302 displays the lock screen indicating the operation mode when the apparatus is in a non-communication state with the stylus 206. In this case, the CPU 302 changes not only the screen but also the internal behavior accordingly. This is the same processing as that in step S1901, and the screen is the normal screen when no operation is performed using the stylus 206. In step S1906, the CPU 302 determines whether communication for authentication with the NFC-enabled stylus 206 has started. If it is determined that communication for authentication with the NFC-enabled stylus 206 has started (YES in step S1906), the process advances to step S1907; otherwise (NO in step S1906), the CPU 302 stands by until communication starts. That is, when the stylus 206 is moved closer again, the CPU 302 starts communication for authentication, and the process advances to step S1907.

In step S1907, the CPU 302 determines whether an elapsed time after communication is interrupted in step S1904 exceeds a given time. If a given time preset in the portable communication terminal apparatus 200 has not elapsed yet (NO in step S1907), the process advances to step S1909, and the CPU 302 returns the screen to the screen (normal screen) displayed when communication is in progress, which was displayed in step S1903. In the example of FIGS. 10A to 10E, the state transits to that shown in FIG. 10D through the states shown in FIGS. 10B and 10C.

On the other hand, if the given time has elapsed (YES in step S1907), the process advances to step S1908. In step S1908, the CPU 302 determines whether the operation has ended. If the operation has not ended (NO in step S1908), the process returns to step S1903. In the example of FIGS. 10A to 10E, the state transits to that shown in FIG. 10E through the states shown in FIGS. 10B and 10C.

On the other hand, if the operation has ended (YES in step S1908), the process ends.

With the above processing, when an operation is performed using the stylus 206, the behavior of the portable communication terminal apparatus 200 can be switched depending on whether the given time has elapsed or not. This processing can implement a display operation of the apparatus in consideration of the usability while maintaining the security.

Note that in this embodiment, the screen is switched using the given time as a condition. However, the present invention is not limited to this. For example, the same control may be implemented by using, as a reference, a numerical value with which it is possible to determine whether a user operation is in progress or has temporarily ended.

Figure 20:
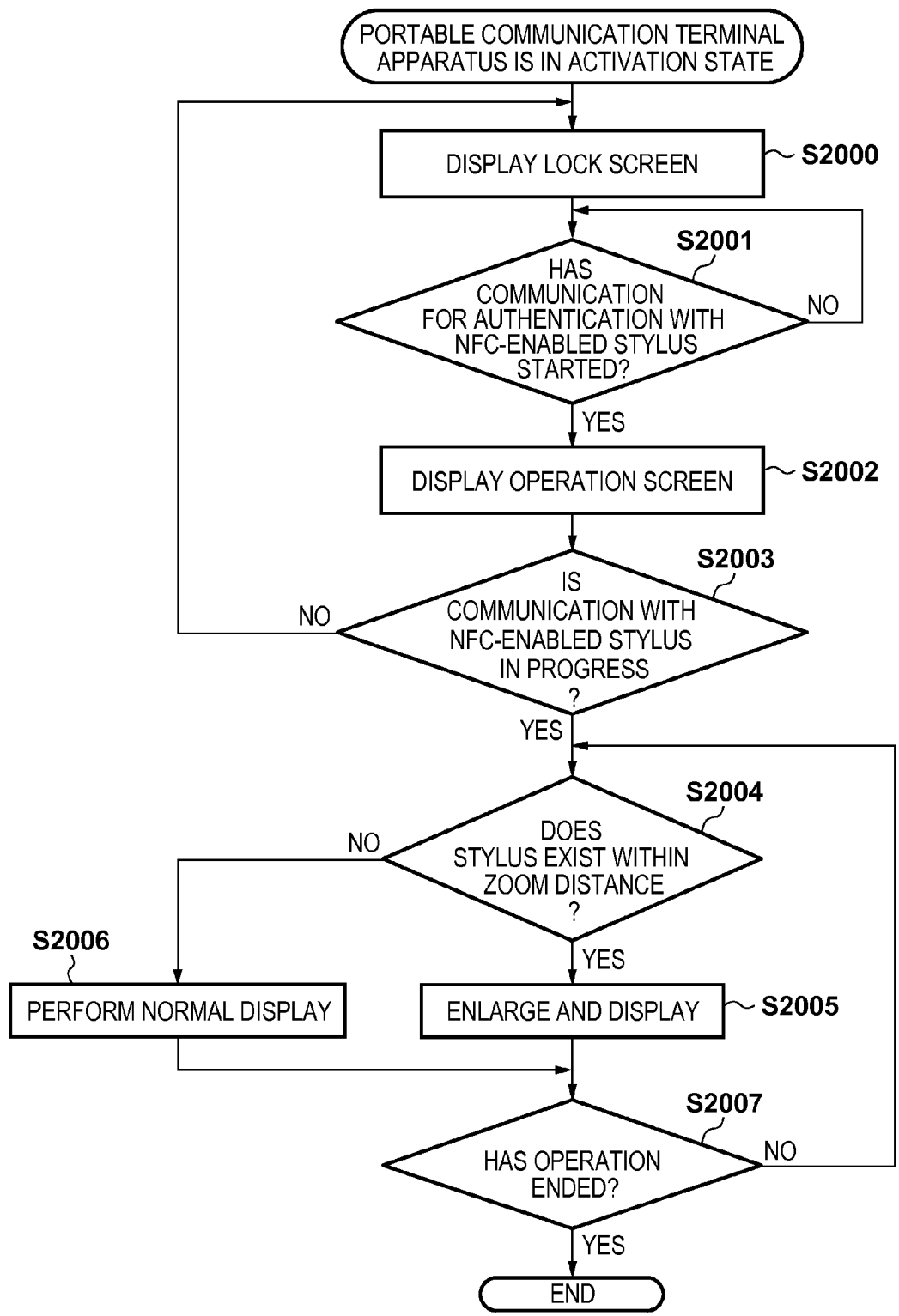
FIG. 20 is a flowchart illustrating processing of zooming in on part of the screen when performing an operation using the stylus.

FIG. 20 is a flowchart illustrating processing in which part of the screen is zoomed in when an operation is performed using the stylus 206.

Note that processing shown in FIG. 20 is implemented when the CPU 302 of the portable communication terminal apparatus 200 reads out a program stored in the ROM 303, and executes it. The processing of FIG. 20 particularly indicates a case in which the processing in FIGS. 12A to 12C is executed.

First, in step S2000, the CPU 302 displays the lock screen (FIG. 12A) indicating the operation mode when the apparatus is in a non-communication state with the stylus 206. In this case, the CPU 302 changes not only the screen but also the internal behavior accordingly. In step S2001, the CPU 302 determines whether communication for authentication with the NFC-enabled stylus 206 has started. If it is determined that communication for authentication with the NFC-enabled stylus 206 has started (YES in step S2001), the process advances to step S2002. This indicates the behavior when the NFC-enabled stylus 206 enters the communication range of the portable communication terminal apparatus 200. If communication for authentication with the NFC-enabled stylus 206 has not started (NO in step S2001), the CPU 302 stands by until communication starts.

When authentication is performed in step S2001 and completed, in step S2002 the CPU 302 displays the operation screen (FIG. 12B). Note that a detailed description of the processes in steps S2000 to S2002 when authentication fails will be omitted.

In step S2003, the CPU 302 determines whether communication with the NFC-enabled stylus is in progress. In other words, in step S2003, the CPU 302 determines whether communication with the stylus has been interrupted. If communication is in progress (YES in step S2003), the process advances to step S2004; otherwise (YES in step S2003), the process returns to step S2000.

In step S2004, the CPU 302 determines whether the stylus 206 exists within the zoom distance. In this embodiment, the CPU 302 determines whether the stylus 206 exists within a given distance within the communicable range. The given distance is set as the zoom distance. Note that the zoom distance need only be set, as needed. For example, a distance at which the screen 1202 is touched may be set as the zoom distance. Alternatively, a very short distance to the screen 1202 while the screen 1202 is not touched may be set as the zoom distance. If the stylus 206 exists within the zoom distance (YES in step S2004), the process advances to step S2005. In step S2005, the CPU 302 enlarges and displays part of the operation screen (FIG. 12C). At this time, in this embodiment, an image closest to the stylus 206 is enlarged and displayed.

On the other hand, if no stylus 206 exists within the zoom distance (NO in step S2004), the process advances to step S2006. In step S2006, the CPU 302 performs normal display of the operation screen. The normal display indicates the display shown in FIG. 12B which is not enlarged.

In step S2007, the CPU 302 determines whether the operation has ended. If the operation has not ended (NO in step S2007), the process returns to step S2004; otherwise (YES in step S2007), the process ends.

The above processing can switch the screen in authentication of the stylus 206 and the internal behavior (processing contents) within the given distance.

Note that in this embodiment, an arrangement of zooming in on the screen display of the portable communication terminal apparatus 200 has been exemplified. The present invention, however, is not limited to this. In this arrangement, it is only necessary to change the behavior within the given distance within the communication range.

Figure 21:
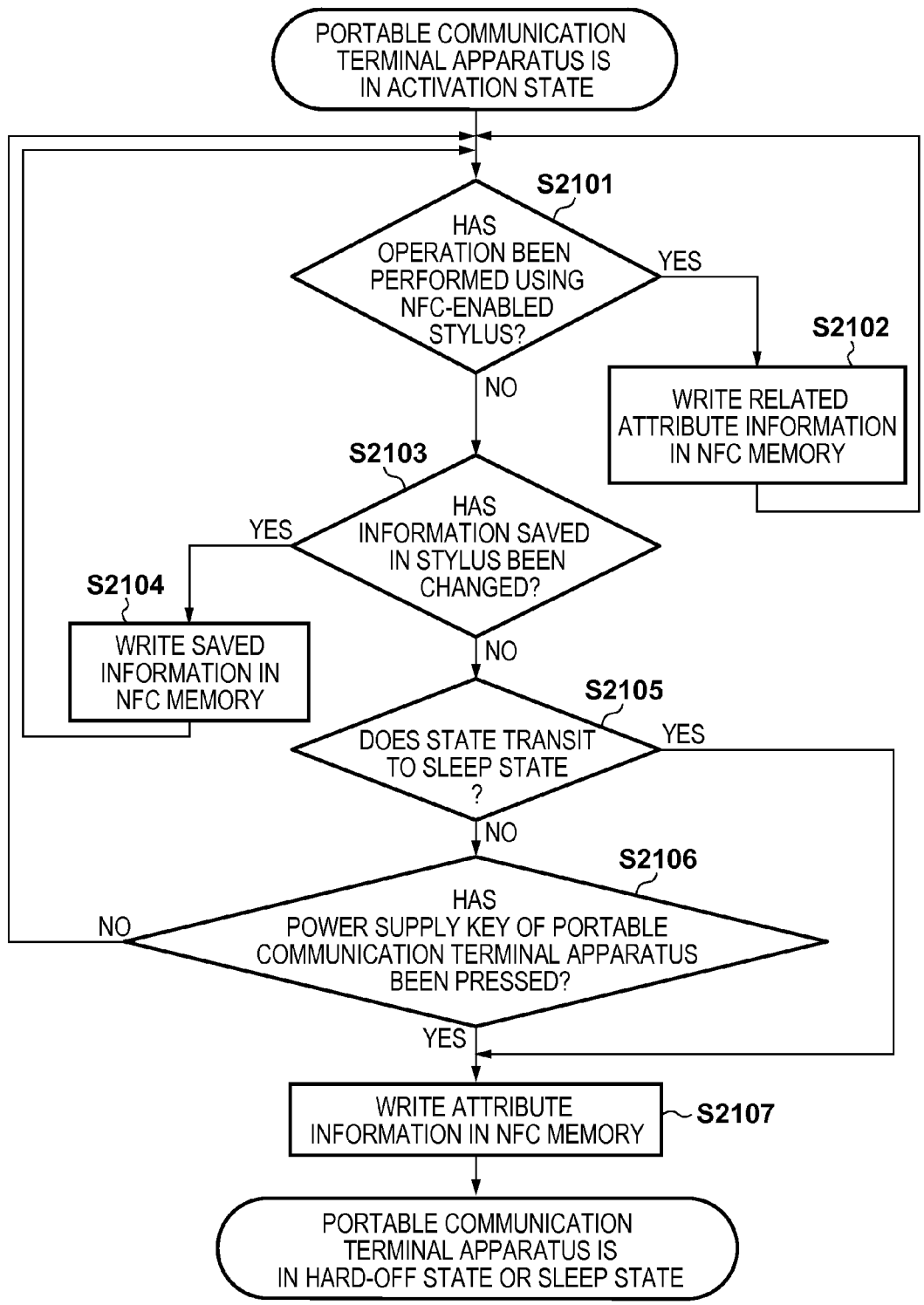
FIG. 21 is a flowchart illustrating processing of writing internal information of the portable communication terminal apparatus in its NFC memory.

FIG. 21 is a flowchart illustrating processing of writing internal information of the portable communication terminal apparatus 200 in its NFC memory.

Even if the portable communication terminal apparatus 200 is in a hard-off state, it is possible to read out information from the NFC memory. By writing information in advance, it is possible to read out the internal information without turning on the power when the communication mode is the passive mode and the portable communication terminal apparatus 200 serves as a target.

When the portable communication terminal apparatus 200 is in an activation state, the CPU 302 determines in step S2101 whether an operation has been performed using the NFC-enabled stylus 206. If an operation has been performed using the NFC-enabled stylus (YES in step S2101), the process advances to step S2102. In step S2102, the CPU 302 writes related attribute information in the NFC memory. After that, the process returns to step S2101.

On the other hand, if no operation has been performed using the NFC-enabled stylus 206 (NO in step S2101), the process advances to step S2103. In step S2103, it is determined whether the information saved in the stylus 206 has been changed. If the information saved in the stylus 206 has been changed (YES in step S2103), the process advances to step S2104. In step S2104, the CPU 302 writes the saved information in the NFC memory. After that, the process returns to step S2101.

If the information saved in the stylus 206 has not been changed (NO in step S2103), the process advances to step S2105. In step S2105, the CPU 302 determines whether to transit to a sleep state. If the CPU 302 determines to transit to the sleep state (YES in step S2105), the process advances to step S2107. In step S2107, the CPU 302 transits to the sleep state after writing the internal information of the related attribute information in the NFC memory. The internal information of the related information to be written indicates the information shown in FIG. 13 and other related information. Furthermore, the present invention is not limited to this, and any information to be exchanged between the stylus 206 and the portable communication terminal apparatus 200 may be written.

On the other hand, if the CPU 302 determines not to transit to the sleep state (NO in step S2105), the process advances to step S2106. In step S2106, the CPU 302 determines whether the power supply key of the portable communication terminal apparatus 200 has been pressed. If the power supply key has been pressed (YES in step S2106), the process advances to step S2107. In step S2107, the CPU 302 transits to the hard-off state after writing the internal information of the portable communication terminal apparatus 200 in the NFC memory. The internal information to be written may be the same as that written when transiting to the sleep state. However, for example, different information such as the time at which the CPU 302 transits to the hard-off state may be written.

On the other hand, if the power supply key has not been pressed (NO in step S2106), the process returns to step S2101. This processing eliminates the need to return from the sleep state or hard-off state to acquire the internal information of the portable communication terminal apparatus 200.

Note that these processes need not be executed in the order shown in FIG. 21, and not all of the processes need be executed. Therefore, the number of processes may be increased/decreased, as needed. Furthermore, in this example, the internal information writing function is implemented by the sequential processes but may be performed by, for example, event driving at each conditional branch. In this case, priority may be set arbitrarily.

In this embodiment, the stylus 206 has the arrangement including the NFC unit and NFC memory. Therefore, data can be saved by the same processing.

Figure 22:
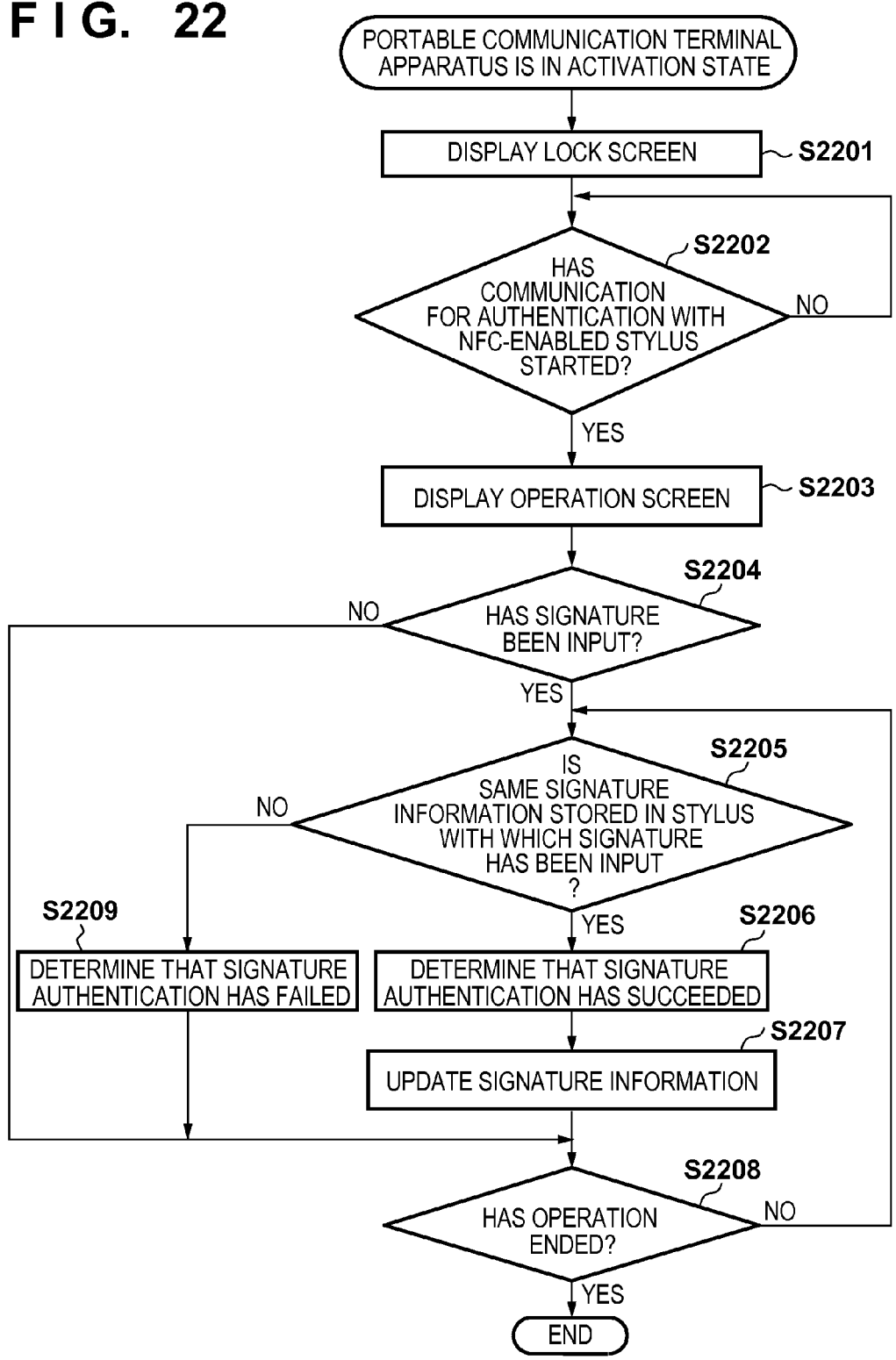
FIG. 22 is a flowchart illustrating signature authentication processing.

FIG. 22 is a flowchart illustrating signature authentication processing.

Note that processing shown in FIG. 22 is implemented when the CPU 302 of the portable communication terminal apparatus 200 reads out a program stored in the ROM 303, and executes it. The processing of FIG. 22 particularly indicates a case in which the processing in FIGS. 7A to 7C is executed.

In step S2201, the CPU 302 displays the lock screen indicating the operation mode when the apparatus is in a non-communication state with the stylus 206. In this case, the CPU 302 changes not only the screen but also the internal behavior accordingly. In step S2202, the CPU 302 determines whether communication for authentication with the NFC-enabled stylus 206 has started. If it is determined that communication for authentication with the NFC-enabled stylus 206 has started (YES in step S2202), the process advances to step S2203. This indicates the behavior when the NFC-enabled stylus 206 enters the communication range of the portable communication terminal apparatus 200. If it is determined that communication for authentication with the NFC-enabled stylus 206 has not started (NO in step S2202), the CPU 302 stands by until communication starts.

When authentication is performed in step S2202 and completed, the CPU 302 displays the operation screen (FIG. 7A) for signature authentication in step S2203. Note that a detailed description of the processes in steps S2201 to S2203 when authentication fails will be omitted.

In step S2204, the CPU 302 determines whether input of a signature to the operation screen (FIG. 7A) has been detected. If no signature has been input, the process advances to step S2208; otherwise, the CPU 302 determines in step S2205 whether the same signature information is stored in the stylus 206 with which the signature has been input. If the same signature information is stored in the stylus 206 (YES in step S2205), the process advances to step S2206. In step S2206, the CPU 302 determines that signature authentication has succeeded. In step S2207, the CPU 302 updates the signature information.

On the other hand, if the same signature information is not stored in the stylus 206 (NO in step S2205), the process advances to step S2209. In step S2209, the CPU 302 determines that signature authentication has failed.

In step S2208, the CPU 302 determines whether the operation has ended. If the operation has not ended (NO in step S2208), the process returns to step S2204; otherwise (YES in step S2208), the process ends.

In step S2207, it is possible to improve the accuracy of feature point information indicating the features of the input signature by comparing the currently input signature information with the past signature information, and merging them to update the signature information. In this example, the portable communication terminal apparatus 200 operates using the information of the stylus 206, and the feature point information is updated by the input signature. In a subsequent operation, the portable communication terminal apparatus 200 operates using the updated feature point information. With this arrangement, it is possible to save, in the stylus 206, the feature point information indicating the features of the signature which reflect the peculiarities of the characters written by the user using the stylus 206. This can improve the accuracy of authentication based on the feature point information stored in the stylus 206.

Figure 23:
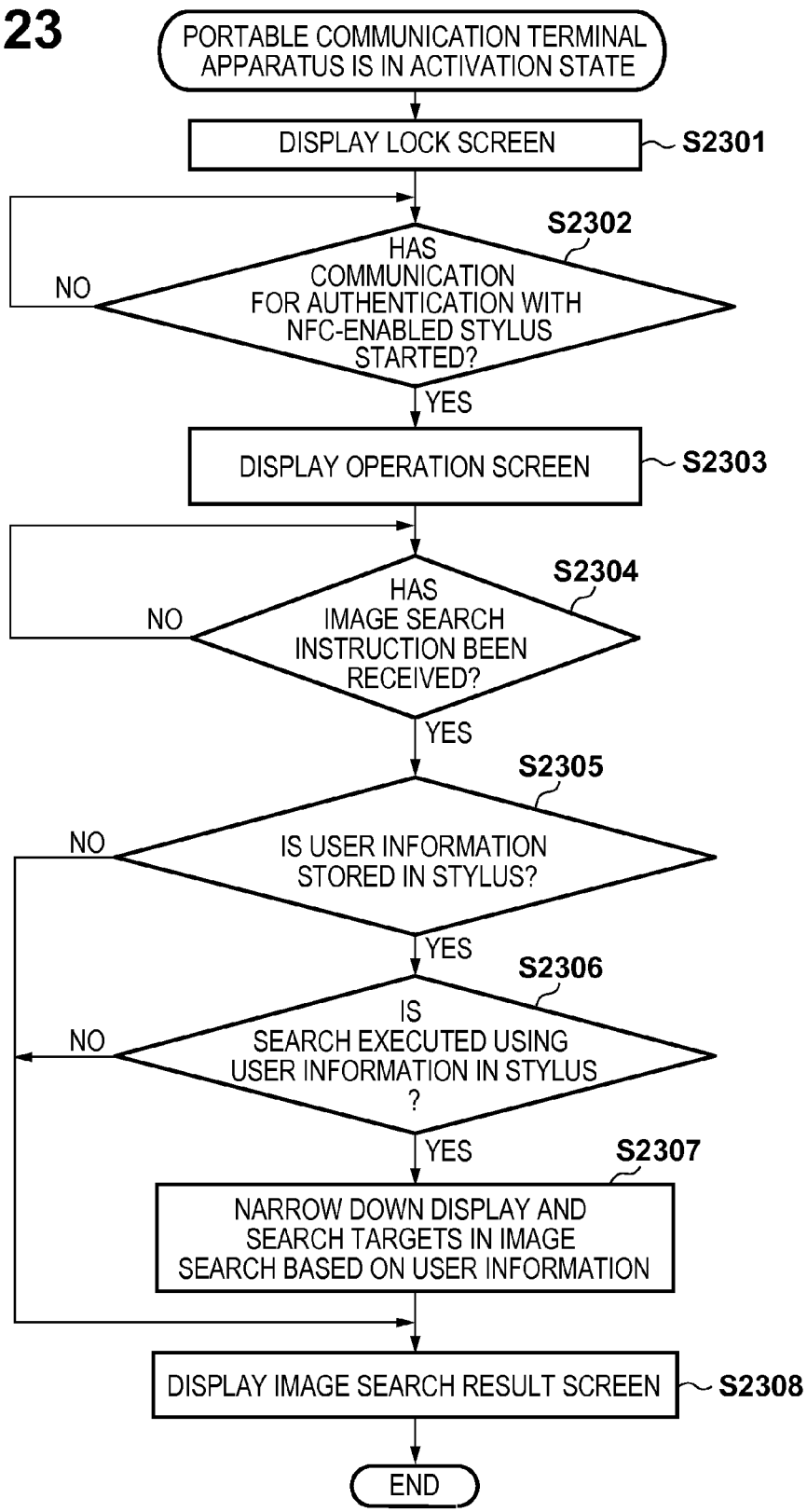
FIG. 23 is a flowchart illustrating image search processing.

FIG. 23 is a flowchart illustrating image search processing.

Note that processing shown in FIG. 23 is implemented when the CPU 302 of the portable communication terminal apparatus 200 reads out a program stored in the ROM 303, and executes it. The processing of FIG. 23 particularly indicates a case in which the image search processing in FIG. 5 is executed but is also applicable to a case in which the mail search processing in FIG. 7B is executed. In addition, the processing is equally applicable to search processing of searching for a search target by inputting a search condition for the search target.

In step S2301, if communication is not in progress, the CPU 302 displays the lock screen indicating the operation mode when the apparatus is in a non-communication state with the stylus 206. In this case, the CPU 302 changes not only the screen but also the internal behavior accordingly. If the CPU 302 determines in step S2302 that communication for authentication with the NFC-enabled stylus 206 has started (YES in step S2302), the process advances to step S2303. This indicates the behavior when the NFC-enabled stylus 206 enters the communication range of the portable communication terminal apparatus 200. If communication for authentication with the NFC-enabled stylus 206 has not started (NO in step S2302), the CPU 302 stands by until communication starts.

When authentication is performed in step S2302 and completed, the CPU 302 displays the operation screen (FIG. 5) for an image search in step S2303. Note that the processes in steps S2301 to S2303 when authentication fails are not considered as the features of this embodiment and a detailed description thereof will be omitted.

In step S2304, the CPU 302 determines whether an image search instruction has been received. In the operation screen 500 of FIG. 5, the CPU 302 determines whether an image search instruction has been received in accordance with whether the search start key 503 has been pressed. If no image search instruction has been received (NO in step S2304), the CPU 302 stands by until an instruction is received; otherwise (YES in step S2304), the process advances to step S2305.

In step S2305, the CPU 302 determines whether user information is stored in the stylus 206. The user information is, for example, the user information shown in FIG. 13. If no user information is stored (NO in step S2305), the process advances to step S2308. In step S2308, the CPU 302 executes an image search for an image as a search target, and displays an image search result screen.

On the other hand, if user information is stored (YES in step S2305), the process advances to step S2306. In step S2306, the CPU 302 determines whether to execute a search using the user information in the stylus 206. This determination processing is performed based on the information saved in the data storage portion 312. If, for example, stroke data such as characters and pictures drawn by the stylus 206 are stored, it is possible to execute a search using the stroke data, and thus the CPU 302 determines to execute a search using the user information in the stylus 206.

If the CPU 302 determines not to execute a search using the user information in the stylus (NO in step S2306), the process advances to step S2308. On the other hand, if the CPU 302 determines to execute a search using the user information in the stylus (YES in step S2306), the process advances to step S2307. In step S2307, the CPU 302 narrows down display and search targets in an image search based on the user information in the stylus. In step S2308, the CPU 302 executes an image search for images as search targets narrowed down, and displays the image search result screen.

With the above processing, it is possible to execute a refine image search using the user information in the stylus 206 in addition to a normal image search.

Note that the image search processing has been explained with reference to FIG. 23. The processing of FIG. 23 is also applicable to a mail search in terms of the user information and a search target being an image. In addition, the kind of information is not limited to them, and the processing of FIG. 23 is applicable to a case in which when searching for other kinds of information instead of images or mail messages, the information is narrowed down using the information saved in the stylus 206.

Figure 24:
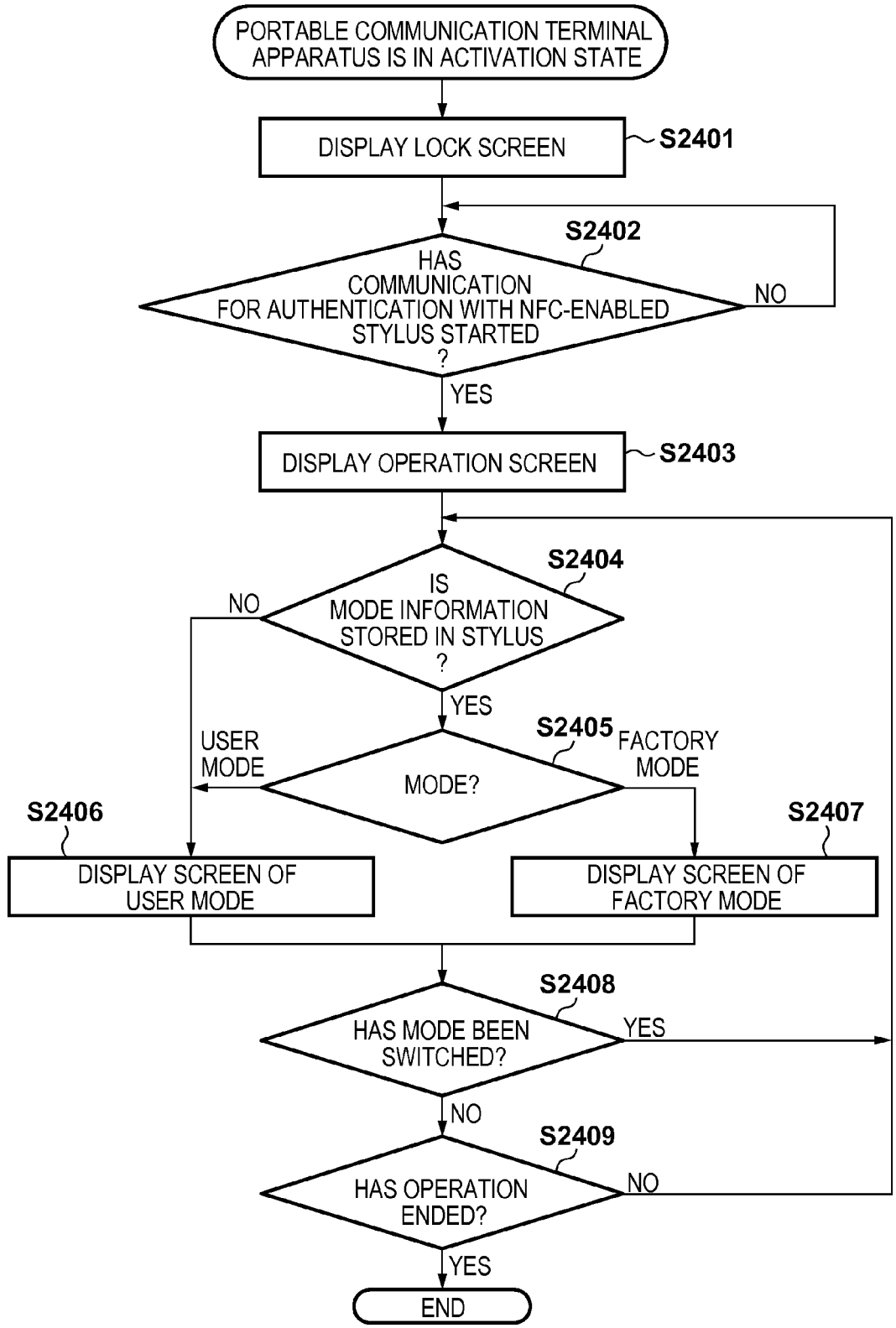
FIG. 24 is a flowchart illustrating processing of switching the mode of the portable communication terminal apparatus according to stylus information.

FIG. 24 is a flowchart illustrating processing of switching the mode of the portable communication terminal apparatus 200 based on stylus information.

Note that processing shown in FIG. 24 is implemented when the CPU 302 of the portable communication terminal apparatus 200 reads out a program stored in the ROM 303, and executes it. The processing of FIG. 24 particularly indicates a case in which the processing in FIGS. 9A to 9C is executed.

In step S2401, the CPU 302 displays the lock screen (FIG. 9B) indicating the operation mode when the apparatus is in a non-communication state with the stylus 206. In this case, the CPU 302 changes not only the screen but also the internal behavior accordingly. If the CPU 302 determines in step S2402 that communication for authentication with the NFC-enabled stylus 206 has started (YES in step S2402), the process advances to step S2403. This indicates the behavior when the NFC-enabled stylus 206 enters the communication range of the portable communication terminal apparatus 200. If communication for authentication with the NFC-enabled stylus 206 has not started (NO in step S2402), it stands by until communication starts.

When authentication is performed in step S2402 and completed, the CPU 302 displays the operation screen in step S2403 (FIG. 9A). Note that a detailed description of the processes in steps S2401 to S2403 when authentication fails will be omitted.

In step S2404, the CPU 302 determines whether mode information (the device mode 1304 of FIG. 13) is stored in the stylus 206. If no mode information is stored (NO in step S2404), the process advances to step S2406. In step S2406, the CPU 302 displays the screen of the user mode. On the other hand, if the mode information is stored (YES in step S2404), the process advances to step S2405.

In step S2405, the CPU 302 determines a mode indicated by the mode information. If the mode is the user mode, the process advances to step S2406, and the CPU 302 displays the screen of the user mode. The process then advances to step S2408. On the other hand, if the mode is the factory mode, the process advances to step S2407, and the CPU 302 displays the screen of the factory mode. The process then advances to step S2408.

In step S2408, the CPU 302 determines whether the mode has been switched. Note that mode switching is implemented by, for example, operating a mode switching control (button, menu, or the like) prepared on the operation screen displayed in each mode.

If the mode has been switched (YES in step S2408), the process returns to step S2404; otherwise (NO in step S2408), the CPU 302 determines in step S2409 whether the operation has ended. If the operation has not ended (NO in step S2409), the process returns to step S2404; otherwise (YES in step S2409), the process ends.

To perform a special operation in the factory, it is necessary to perform a unique authentication operation so that the user cannot understand it. However, performing an authentication operation for each operation imposes a load. To solve this problem, in this embodiment, the factory mode is stored in the stylus 206. If the factory mode is set in the stylus 206, using the stylus 206 eliminates the need for an authentication operation. By switching the mode to the user mode (normal mode), the screen of the user mode can be displayed.

By using the one stylus 206 storing the factory mode, it is not necessary to perform an authentication operation for each operation even for a plurality of apparatuses. It is possible to enter the factory mode and perform an operation by only performing an operation using the stylus for the factory mode, thereby eliminating the need for an authentication operation for each operation.

Note that in this embodiment, the stylus 206 includes a plurality of pieces of mode information, and the mode information can be set, as needed. The present invention, however, is not limited to this. For example, one kind of mode information may be saved in the stylus 206. In this case, the contents of an operation which can be performed for the portable communication terminal apparatus 200 change depending on the mode information stored in the stylus 206. That is, for example, if the portable communication terminal apparatus 200 can perform display in a plurality of modes, it can perform display in a mode corresponding to the stylus 206. In other words, it is possible to set to perform display in a different mode for each stylus 206. More specifically, for example, when authentication of the stylus 206 storing mode information for the factory is performed, the mode is set to the factory mode to display the factory screen indicating the factory mode, as shown in FIG. 9C. If authentication of the stylus 206 storing mode information for the normal mode is performed, the normal screen indicating the normal mode is displayed, as shown in FIG. 9A. In this case as well, the processing can be performed according to the sequence shown in FIG. 24, and NO is always determined in step S2408.

As described above, according to this embodiment, it is possible to change the behavior of an apparatus operable by a stylus according to information saved in the stylus, and implement reliable and secure authentication processing in terms of an authentication operation and security. Furthermore, in terms of the usability, it is possible to reduce the number of operations in an operation such as an authentication operation.

For example, authentication is performed by processing of comparing operation contents (input of strokes (loci) such as a signature) of a stylus, with which communication is established, with data saved in the stylus. This method can implement an arrangement of performing double authentication which cannot be implemented by authentication by a conventional card reader and in which "an authenticated device creates authentication data".

With the same arrangement, it is possible to provide a method including a smaller number of steps while performing authentication, as compared with an operation by a normal stylus.

Note that in the above-described embodiment, the plurality of examples have been exemplified. It is only necessary to include at least one of these functions. That is, some or all of the functions may be included.

An arrangement in which an operation is performed using the stylus 206, and the behavior of the portable communication terminal is switched based on information saved in the stylus 206 is not limited to the above-described one.

In the above-described embodiment, if communication with the NFC-enabled stylus is not in progress, the lock screen is displayed. The present invention, however, is not limited to this. For example, even if communication with the NFC-enabled stylus is not in progress, the operation screen may be displayed.

In the above-described embodiment, when the portable communication terminal apparatus 200 is set in an activation state, the lock screen is displayed first. The present invention, however, is not limited to this. When the portable communication terminal apparatus 200 is set in an activation state, the operation screen may be displayed first.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-037318, filed Feb. 27, 2014, which is hereby incorporated by reference wherein in its entirety.

What is claimed is:

1. An information processing apparatus comprising:
a communication unit configured to communicate with an operation device by power generated when a communication portion included in the operation device comes close to within a predetermined distance range;
an acquisition unit configured to acquire information held by the operation device via the communication portion of the operation device;
a reception unit configured to receive an operation from the operation device by an operation portion while the communication unit establishes communication with the communication portion; and
a control unit configured to control an operation based on the information acquired by the acquisition unit while the communication unit establishes communication with the communication portion,
wherein the operation portion includes a display unit configured to display an operation screen which receives an operation from the operation device,
wherein the operation screen is a language setting screen for setting one of a plurality of kinds of display languages, and
wherein while the communication unit establishes communication with the communication portion, the control unit switches the language setting screen in accordance with the information acquired by the acquisition unit.

2. The apparatus according to claim 1, wherein the display unit displays a predetermined operation screen while the communication unit establishes communication with the communication portion.

3. The apparatus according to claim 1, wherein the operation screen is a screen to be used in one of a plurality of kinds of operation modes.

4. The apparatus according to claim 1, wherein in a case that a predetermined operation is performed to the operation screen displayed by the display unit while the communication unit establishes communication with the communication portion, the control unit inputs, as input data in the information processing apparatus, the information acquired by the acquisition unit.

5. The apparatus according to claim 1, wherein while the communication unit establishes communication with the communication portion, the control unit inputs, as input data in the information processing apparatus, the information acquirable by the acquisition unit.

6. An information processing apparatus comprising:
a communication unit configured to communicate with an operation device by power generated when a communication portion included in the operation device comes close to within a predetermined distance range;
an acquisition unit configured to acquire information held by the operation device via the communication portion of the operation device;
a reception unit configured to receive an operation from the operation device by an operation portion while said communication unit establishes communication with the communication portion; and a control unit configured to control an operation based on the information acquired by said acquisition unit while said communication unit establishes communication with the communication portion, wherein while the communication unit establishes communication with the communication portion, the control unit extracts feature points of operation contents performed by the operation device to the operation portion, and corrects the feature points based on the information acquired by the acquisition unit.

7. The apparatus according to claim 6, wherein authentication processing is executed based on the information acquired by the acquisition unit and information received by the reception unit from the operation device.

8. The apparatus according to claim 6, further comprising a holding unit configured to hold predetermined information, wherein authentication processing is executed based on the information acquired by the acquisition unit and the predetermined information held by the holding unit.

9. An information processing apparatus comprising:

a communication unit configured to communicate with an operation device by power generated when a communication portion included in the operation device comes close to within a predetermined distance range;

an acquisition unit configured to acquire information held by the operation device via the communication portion of the operation device;

a reception unit configured to receive an operation from the operation device by an operation portion while the communication unit establishes communication with the communication portion; and a control unit configured to control an operation based on the information acquired by the acquisition unit while the communication unit establishes communication with the communication portion, wherein the operation portion includes a display unit configured to display an operation screen which receives an operation from the operation device and wherein the control unit switches the operation screen to be displayed by the display unit in accordance with an elapsed time from when the communication unit cannot ensure communication with the communication portion until the communication unit can ensure communication again.

10. An information processing apparatus comprising:

a communication unit configured to communicate with an operation device by power generated when a communication portion included in the operation device comes close to within a predetermined distance range;

an acquisition unit configured to acquire information held by the operation device via the communication portion of the operation device;

a reception unit configured to receive an operation from the operation device by an operation portion while the communication unit establishes communication with the communication portion; and a control unit configured to control an operation based on the information acquired by the acquisition unit while the communication unit establishes communication with the communication portion, wherein the operation portion includes a display unit configured to display an operation screen which receives an operation from the operation device and wherein while the communication unit establishes communication with the communication portion, the control unit changes a display mode of a predetermined region of the operation screen displayed by the display unit in accordance with a distance between the operation device and the information processing apparatus.

11. An information processing apparatus comprising:

a communication unit configured to communicate with an operation device by power generated when a communication portion included in the operation device comes close to within a predetermined distance range;

an acquisition unit configured to acquire information held by the operation device via the communication portion of the operation device;

a reception unit configured to receive an operation from the operation device by an operation portion while the communication unit establishes communication with the communication portion; and a control unit configured to control an operation based on the information acquired by the acquisition unit while the communication unit establishes communication with the communication portion, wherein while the communication unit establishes communication with the communication portion, the control unit switches processing contents to be executed in the information processing apparatus in accordance with a distance between the operation device and the information processing apparatus.

12. A control method for an information processing apparatus, comprising:

communicating with an operation device by power generated when a communication portion included in the operation device comes close to within a predetermined distance range;

acquiring information held by the operation device via the communication portion of the operation device;

displaying, on a display included in the operation portion, an operation screen which receives an operation from the operation device and which is a language setting screen for setting one of a plurality of kinds of display languages;

receiving an operation from the operation device by an operation portion while communication with the communication portion is established; and controlling an operation based on the acquired information while communication with the communication portion is established wherein the language setting screen is switched in accordance with the acquired information in the controlling.

13. A non-transitory computer-readable storage medium storing a program for causing a computer to control an information processing apparatus which receives an operation from an operation device by an operation portion and executes processing, the program causing the computer to function as a communication unit configured to communicate with the operation device by power generated when a communication portion included in the operation device comes close to within a predetermined distance range, an acquisition unit configured to acquire information held by the operation device via the communication portion of the operation device, a reception unit configured to receive an operation from the operation device by the operation portion while the communication unit establishes communication with the communication portion, and a control unit configured to control an operation based on the information acquired by the acquisition unit while the communication unit establishes communication with the communication portion, wherein the operation portion includes a display unit configured to display an operation screen which receives an operation from the operation device, wherein the operation screen is a language setting screen for setting one of a plurality of kinds of display languages, and wherein while the communication unit establishes communication with the communication portion, the control unit switches the language setting screen in accordance with the information acquired by the acquisition unit.

\* \* \* \* \*